(12) United States Patent
Wasowicz et al.

(10) Patent No.: US 6,299,452 B1
(45) Date of Patent: Oct. 9, 2001

(54) DIAGNOSTIC SYSTEM AND METHOD FOR PHONOLOGICAL AWARENESS, PHONOLOGICAL PROCESSING, AND READING SKILL TESTING

(75) Inventors: Janet Marie Wasowicz, Evanston, IL (US); Art Carl Maerlender, Jericho, VT (US)

(73) Assignee: Cognitive Concepts, Inc., Evanston, IL (US)

( * ) Notice: Subject to any disclaimer, the term of this patent is extended or adjusted under 35 U.S.C. 154(b) by 0 days.

(21) Appl. No.: 09/350,791

(22) Filed: Jul. 9, 1999

(51) Int. Cl.[7] .................................................. G09B 17/00
(52) U.S. Cl. .......................... 434/178; 434/350; 434/322; 434/323; 434/185; 434/184; 434/156; 434/159; 434/167
(58) Field of Search .................................... 434/350, 322, 434/323, 185, 184, 317, 156, 159, 167, 178; 704/1

(56) References Cited

U.S. PATENT DOCUMENTS

| | | |
|---|---|---|
| 4,166,452 | 9/1979 | Generales, Jr. . |
| 4,285,517 | 8/1981 | Morrison . |
| 4,363,482 | 12/1982 | Goldfarb . |
| 4,770,416 | 9/1988 | Shimuzu et al. . |
| 5,122,952 * | 6/1992 | Minkus ............................... 705/26 X |
| 5,149,084 | 9/1992 | Dalebout et al. . |
| 5,387,104 * | 2/1995 | Corder ............................ 434/156 X |

(List continued on next page.)

OTHER PUBLICATIONS

Auditory Processing Enhancement Programs, vol. 2: Auditory Discrimination/Phonological Awareness, Academic Communication Associates (1997).
Perceive & Respond vol. 1: Environmental Sounds—Second Edition, Academic Communication Associates (1997).
Perceive & Respond vol. 2: Listening for Auditory Differences—Second Edition, Academic Communication Associates (1997).
Perceive & Respond vol. 3: Auditory Sequential Memory—Second Edition Academic Communication Associates (1997).
Assessment and Instruction in Phonological Awareness, Florida Dept. of Education (1999).
Central Test Battery, Precision Acoustics.
*Innerlogic Reading Edge: Educator's Guide*, Innerlogic Software (1998).
*Central Test Battery*, Precision Acoustics (1998).
R. Haaf et. al., "Computer–Based Language Assessment Software: The Effects of Presentation and Response Format", *Language, Speech, and Hearing Services in Schools*, vol. 3, pp 68–74 (1999).
*Phonemic Awareness in Young Children: A Classroom Curriculum*, Chapter 10 by Paul H. Brookes Publishing Co. (1998).

(List continued on next page.)

Primary Examiner—Valencia Martin-Wallace
Assistant Examiner—Chanda Harris
(74) Attorney, Agent, or Firm—Gray, Cary, Ware & Freidenrich

(57) ABSTRACT

A diagnostic system and method for evaluating one or more phonological awareness, phonological processing and reading skills of an individual to detect phonological awareness, phonological processing and reading skill deficiencies in the individual so that the risk of developing a reading deficiency is reduced and existing reading deficiencies are remediated. The system may use graphical games to test the individual's ability in a plurality of different phonological awareness, phonological processing and reading skills. The system may use speech recognition technology to interact with the tests.

68 Claims, 21 Drawing Sheets

U.S. PATENT DOCUMENTS

| | | |
|---|---|---|
| 5,513,126 | 4/1996 | Harkins et al. . |
| 5,579,469 | 11/1996 | Pike . |
| 5,649,826 | 7/1997 | West et al. . |
| 5,692,906 | 12/1997 | Corder . |
| 5,694,546 | 12/1997 | Reisman . |
| 5,727,950 | 3/1998 | Cook et al. . |
| 5,743,743 | 4/1998 | Ho et al. . |
| 5,743,746 | 4/1998 | Ho et al.. . |
| 5,751,953 | 5/1998 | Shiels et al. . |
| 5,762,503 | 6/1998 | Hoo et al. . |
| 5,813,862 * | 9/1998 | Merzenich et al. ............. 434/185 X |
| 5,836,771 | 11/1998 | Ho et al. . |
| 5,863,208 | 1/1999 | Ho et al. . |
| 5,884,302 | 3/1999 | Ho . |
| 5,920,838 | 6/1999 | Mostow et al. . |
| 5,927,988 | 7/1999 | Jenkins et al. . |
| 5,934,909 | 8/1999 | Ho et al. . |
| 5,934,910 | 8/1999 | Ho et al. . |
| 5,944,530 | 8/1999 | Ho et al. . |
| 5,957,699 | 9/1999 | Peterson et al. . |
| 5,967,793 | 10/1999 | Ho et al. . |
| 6,009,397 | 12/1999 | Siegel . |
| 6,019,607 * | 2/2000 | Jenkins et al. ................... 434/116 X |
| 6,056,551 * | 5/2000 | Marasco .......................... 434/178 X |
| 6,077,085 * | 6/2000 | Parry et al. ...................... 434/322 X |
| 6,113,393 * | 9/2000 | Neuhaus .......................... 434/178 X |

OTHER PUBLICATIONS

J.K. Torgesen et al., *Test of Phonological Awareness: Examiner's Manual*, Pro–Ed, (1994).

C.H. Lindamood et al., *The LAC Test* (*Lindamood Auditory Conceptualization Test*) *Revised Edition—Manual* (1971).

C. Robertson et al., *The Phonological Awareness Test—Examiner's Manual*, LinguiSystems, Inc. (1997).

J.K. Torgesen et al., "*TOWRE—Test of Word Reading Efficiency—Examiner's Manual*", Pro–Ed (1999).

R.K. Wagner et al., "*CTOPP—Comprehensive Test of Phonological Processing—Examiner's Manual*", Pro–Ed (1999).

* cited by examiner

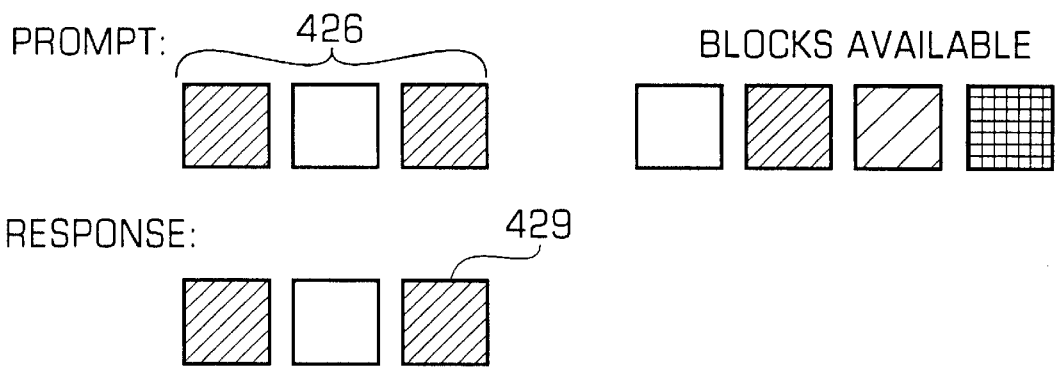
FIGURE 16
|   |   |   |
|---|---|---|
| 1 | 6 | 2 |
| 4 |   | 9 |
| 5 | 8 | 3 |
FIGURE 18
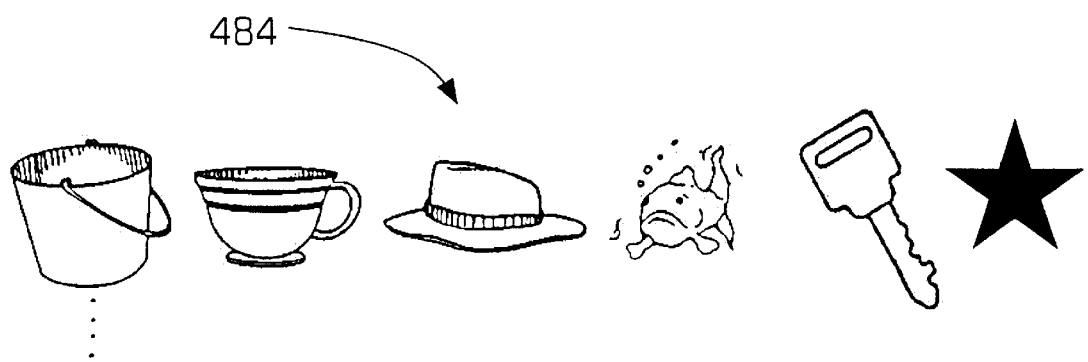
FIGURE 20

| taf | cag | dop | mib |

FIGURE 24

Does a dog have four legs? 564

YES   NO

DIAGNOSTIC SYSTEM AND METHOD FOR PHONOLOGICAL AWARENESS, PHONOLOGICAL PROCESSING, AND READING SKILL TESTING

BACKGROUND OF THE INVENTION

This invention relates generally to a diagnostic system and method for testing one or more different areas of phonological awareness, phonological processing, verbal short term memory, rapid access naming, phonemic decoding and reading fluency in order to determine if the individual being tested is at risk to having reading problems and the areas in which the individual may need further training.

It is well known that a relationship exists between phonological processing abilities of an individual and the normal acquisition of beginning reading skills. For inefficient and disabled readers, the reading impasse exists in the perceptual and conceptual elusiveness of phonemes. Phonemes are the smallest units of speech that correspond to the sounds of our spoken language. Our phonologically based language requires that students have a sensitivity to and an explicit understanding of the phonological structure of words. This explicit understanding of the phonological structure of words is known as phonological awareness. Phonological awareness skills are displayed by an individual when the individual is able to isolate and identify individual sounds within words and to manipulate those identified sounds. Phonological processing refers to the use of information about the sound structure of oral language to process oral and written information. These include verbal short term memory and rapid access naming.

The English language has words that are comprised of sounds in some predetermined order. From the vast number of possible sequences of sounds, words in the English language actually use a relatively small number of sequences and the majority of these sequences are common to many words. A child who becomes aware of these common sound sequences is typically more adept at mastering these sequences when the words are presented in their printed form (i.e., when the child is reading the words) than a child who lacks this awareness of sounds. For example, the word "mat" has three distinct phonemes /m/, /ae/ and /t/. The words "sat" and "bat" have different initial phonemes, /s/ and /b/ respectively, but share the middle and final phonemes (/ae/ and /t/, respectively) that form the common spelling pattern "at". To a child with normal phonological awareness, our alphabetic orthography appears to be a sensible system for representing speech in writing. Thus, a child may employ the strategy of sounding out unknown words or letter sequences by analogy to known words with identical letter sequences. For example, the child may pronounce the unknown word "bat" by rhyming it with the known word "cat".

Phonological awareness skills are grouped into two categories including synthesis and analysis. Phonological synthesis refers to the awareness that separate sound units may be blended together to form whole words. Phonological analysis refers to the awareness that whole words may be segmented into a set of sound units, including syllables, onset-rimes and phonemes. Both analysis and synthesis skills have been identified as important prerequisites for achieving the goal of early reading skill proficiency and deficits of either and/or both of these skills are typically present in children with reading disabilities.

In addition to these phonological awareness skills, there are two other phonological skills that have been linked to efficient reading ability. These skills are phonetic coding in verbal short term memory and rapid, automatic access to phonological information. Phonetic coding refers to the child's ability to use a speech-sound representation system for efficient storage of verbal information in working memory. The ability to efficiently use phonetic codes to represent verbal information in working memory may be measured by performance on memory span tasks for items with verbal labels. Children with reading problems have been found to perform poorly on memory span tasks for items with verbal labels. Thus, phonetic coding is an important skill for a reader, such as a beginning reader. For a beginning reader, he/she must 1) first decode each sound in the pattern by voicing the appropriate sound for the appropriate symbol; 2) store the appropriate sounds in short term memory while the remainder of the symbols are being sounded out; and 3) blend all of the sounds from memory together to form a word. The efficient phonetic representation in verbal short term memory permits beginning readers to devote less cognitive energy to the storage of sound symbol correspondence thus leaving adequate cognitive resources to blend the sounds together to form the word.

The strong performance of a child on rapid naming skills that requires rapid and automatic access to phonological information that is stored in long term memory is highly predictive on how well a child will learn fluent word identification skills. A reading-disabled child may normally perform much more slowly on these rapid naming tasks than a child with a normal reading skill. The rapid access of phonological information in memory may make the task of assembling word parts together much easier so that reading is easier.

In addition to assessing phonological processing skills that do not require knowledge of print, three other measures of pre-reading and reading skills prove helpful in monitoring a child's growth once reading instruction begins. In particular, the child's knowledge about letters, the child's phonemic decoding skill and the child's fluency of reading should be monitored during the first three grades in order to identify the need for early intervention that will prevent reading problems later on. It is desirable to be able to test these pre-reading and reading skills in order to further determine if a child is at risk.

Returning to the relationship between phonological processing and reading, an individual with good phonological processing skills and good phonological awareness tends to be better able to learn to read. In addition, phonological processing deficits have been identified by researchers as the most probable cause of reading-related learning disabilities. Due to this link, many states have started to mandate phonological awareness training as part of regular classroom reading curricula. At the same time, school personnel are being required to be accountable and take responsibility for the classroom curriculum and the remedial reading services they provide. The problem is that there is no diagnostic tool currently available to help professionals and the school personnel to identify children who are at-risk due to phonological awareness deficit and to help plan, evaluate and document the effectiveness of intervention and instructional methods.

A number of assessment tools are presently available to professionals to measure phonological processing and related skills. These include the *Test of phonological Awareness* (TOPA), the *Lindamood Auditory Conceptualization Test* (LAC), *The Phonological Awareness Test* (PAT), the *Comprehensive Test of Phonological Testing* (CTOPP) and a screening measure published in an educational textbook,

*Phonemic Awareness in Young Children: A Classroom Curriculum.* None of these conventional assessment tools are software based and therefore have limitations. For example, these conventional assessment tools must be manually administered so that the testing is not necessarily standardized since each test giver may give the test in a slightly different manner that reduces the reliability of the resulting assessment. These manually administered assessment tools also make the scoring, charting and comparison of the test results more difficult. These conventional assessment tests require that a skilled person administrate the assessment test. In addition, the number of children who may be tested at any one time is limited to one child for each test administrator. These conventional assessment tests may also cause test anxiety that may cause the test results to inaccurately reflect the child's abilities. Thus, it is desirable to provide a diagnostic system and method for phonological awareness testing that overcomes the above problems and limitations of conventional assessment tests and it is to this end that the present invention is directed.

SUMMARY OF THE INVENTION

The diagnostic system and method for evaluating phonological awareness and processing skills and related pre-reading and reading skills in accordance with the invention provides a system for identifying individuals, such as children in kindergarten through second grade, who are likely to experience academic failure due to phonological processing deficits and a lack of phonological awareness. The system may also determine the relative weaknesses and strengths of the individual or group of individuals in different phonological awareness and processing areas or related reading skills in order to help develop appropriate intervention and curriculum activities to improve the weak skills and areas. The system may also track, over time, an individual's development or a group's development of various phonological awareness and processing skills and relating reading skills and establish a baseline so that the effectiveness of instructional methods may be evaluated. The system may identify individual with weak phonological awareness and processing skills and correct those skills before the individual develops a reading problem. In a preferred embodiment, the diagnostic tool may be one or more software applications being executed on a Web server so that the diagnostic tool may be an Internet or World Wide Web (the Web) based tool that provides an easily accessible and affordable screening tool to help parents determine, in the comfort of their own home, if their child is at-risk for academic failure due to phonological awareness and processing deficits. The system may also suggest solutions (training modules that train a particular phonological awareness, phonological processing skill or a related reading or pre-reading skill) for a parent to consider in correcting the phonological awareness and processing deficits.

In more detail, the diagnostic system in accordance with a preferred embodiment of the invention may include one or more software applications that may be stored on a portable media, such as a CD or a zip disk or may be stored on a server. The diagnostic system provides various to advantages over conventional diagnostic tools. The system permits more standardized administration of the tests that leads to more reliable assessments. The system also permits more efficient, accurate and reliable scoring and tracking of an individual's phonological awareness and processing abilities so that the individual's progress may be determined by comparing the various test results to one another and comparing the results of tests given at different time to each other. The system may be administered by people who do not necessarily understand the intricacies of phonological awareness and processing skills. In addition, the system may be administered simultaneously to a large number of individuals since each children may use a separate computer to complete the tests. Finally, the engaging graphical game format of the tests within the diagnostic system may reduce an individual's test anxiety so that a more accurate test may be conducted.

The diagnostic system may include one or more interactive computer activities that permit the diagnostic system to measure one or more different types of phonological awareness processing skills, knowledge of sound-symbol correspondences and fluency of decoding and reading. The system in accordance with the invention may also collect risk factor and other relevant data about each individual, assess performance on activities that measure phonological awareness and processing skill, analyze risk factor data and performance data for individuals or groups of individuals, and report those results. In a preferred embodiment, the system may be used for diagnosing phonological awareness and processing skill deficits in a young child.

Thus, in accordance with the invention, a system and method for testing one or more skills associated with the reading skills of an individual is provided. The method comprises presenting one or more stimuli to the individual, each stimulus associated with a test for testing a particular reading or pre-reading skill of the individual, the skills indicating the risk that the individual develops a language-based learning disability. The method further comprises receiving a response from the individual to each stimulus, scoring the user's responses to each test, and recommending, based on the scores of the one or more tests, one or more training modules for improving a reading or pre-reading skill of the individual as indicated by the score of the tests.

BRIEF DESCRIPTION OF THE DRAWINGS

FIG. 16 is a diagram illustrating an example of how the child's ability to manipulate sounds may be tested in accordance with the invention;

FIG. 18 is a diagram illustrating an example of how the child's ability to recall spoken items in sequential order may be tested in accordance with the invention;

FIG. 20 is a diagram illustrating an example of how the child's ability to rapidly name visually-presented items may be tested in accordance with the invention;

FIG. 22 is a diagram illustrating an example of how a child's ability to name letters and sound/symbol associations may be tested in accordance with the invention;

FIG. 24 is a diagram illustrating an example of how a child's ability to decode words may be tested in accordance with the invention;

FIG. 26 is a diagram illustrating an example of how a child's ability for fluent reading may be tested in accordance with the invention.

DETAILED DESCRIPTION OF THE PREFERRED EMBODIMENT

The invention is particularly applicable to a World Wide Web (Web) based diagnostic system for determining a child's phonological awareness and processing skills and reading skills and it is in this context that the invention will be described. It will be appreciated, however, that the system and method in accordance with the invention has greater utility since it may be implemented on other types of computer systems, such as the Internet, a local area network, a wide area network or any other type of computer network. The system may also be used to test a variety of other individuals, such as illiterate and mentally disabled people, individuals whose native language is not English who are learning to read, and adolescents and adults who read poorly and wish to improve their reading skills.

Figure 1:
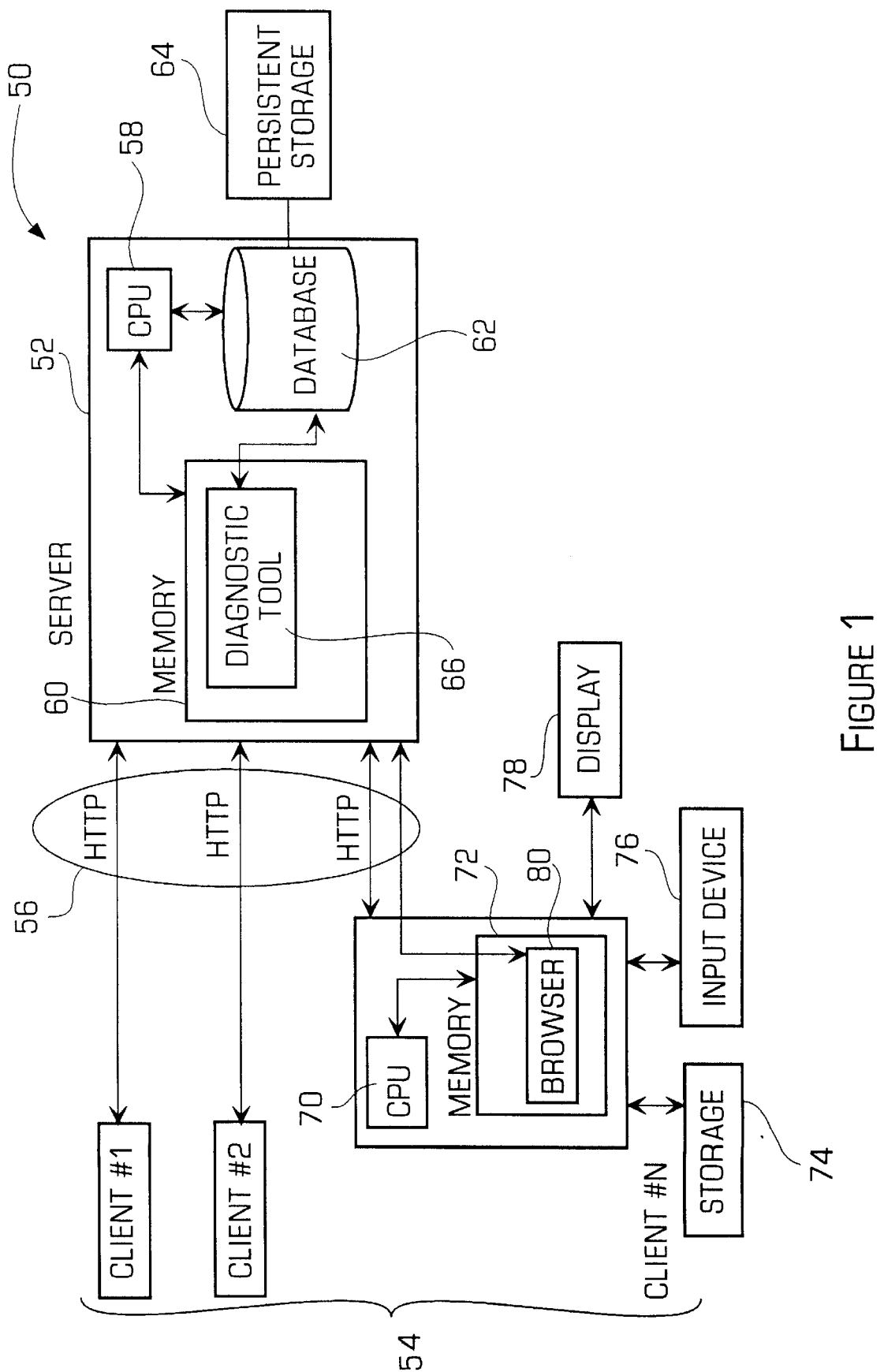
FIG. 1 is a block diagram illustrating a computer-based phonological skills diagnostic system in accordance with the invention.

FIG. 1 is a block diagram illustrating an embodiment of a computer-based phonological skills diagnostic system 50 in accordance with the invention. In this embodiment, the diagnostic system 50 may include a server 52 and one or more client computers 54 (Client #1–Client #N) connected together by a communications network 56, that may be the Internet, the World Wide Web (the Web), a local area network, a wide area network or any other type of communications network. In the embodiment shown, the communications network is the Web and a typical Web communications protocol, such as the hypertext transfer protocol (HTTP), may be used for communications between the server and the client computer. In particular, the server may download one or more Web pages to each client computer and each client computer may send responses back to the server.

The server may further comprise a central processing unit (CPU) 58, a memory 60, a database (DB) 62, a persistent storage device 64 and a diagnostic tool 66. In a preferred embodiment, the diagnostic tool may be one or more software applications (testing different phonological awareness and processing skills or reading skills) stored in the persistent storage of the server that may be downloaded into the memory 60 (as shown in FIG. 1) so that the diagnostic tool may be executed by the CPU 58 of the server. In the preferred Web-based embodiment, the DB 62 or persistent storage device 64 may store one or more Web pages associated with the diagnostic tool 66. The Web pages may be downloaded to each client computer when the client computer requests the particular Web page. The server may also include the necessary hardware and software to accept requests from one or more client computers. In the preferred embodiment, the Web pages may be communicated to the one or more client computers using the HTTP protocol and the client computers may send data back to the server, such as test responses, using the same protocol.

Each client computer 54 (Client #N will be described herein, but it should be realized that each client computer is substantially similar) may be used by an individual user, such as a parent of a child or a test administrator, to access the diagnostic tool stored on the server. Each client computer 54 may include a central processing unit (CPU) 70, a memory 72, a persistent storage device 74 such as a hard disk drive, a tape drive, an optical drive or the like, an input device 76 such as a keyboard, a mouse, a joystick, a speech recognition microphone or the like, and a display 78 such as a typical cathode ray tube, a flat panel display or the like. Each client computer may also include a browser application 80 that may be stored in the persistent storage device and downloaded to the memory 72 as shown in the figure. The browser application may be executed by the CPU 70 and may permit the user of the client computer to interact with the Web pages being downloaded from the server 52. In this system, multiple client computers may establish simultaneous communications sessions with the server and each client computer may be downloading Web pages from the server. The system 50 thus permits multiple client computers to access the diagnostic tool 66 stored on the server so that the user of each client computer may take advantage of the benefits of the diagnostic tool.

As described below in more detail, the diagnostic tool may include one or more different tools that test various phonological awareness or processing skills as well as reading skills so that a child's proficiency at phonological awareness and processing skills and reading skills may be determined. The diagnostic tool 66 may also use a child's scores on the one or more tools in order to recommend to the user of the client computer (e.g., the parent of the child) which training tools the parent may consider downloading to help the child with any deficiencies. These training tools may also be stored in the persistent storage device 64 connected to the server so that the user may then download the training tool from the server as well. The training tools are described in more detail in co-pending U.S. patent application Ser. No. 09/039,194 and 60/103,354, filed Mar. 13, 1998 and Oct. 7, 1998, respectively, that are incorporated herein by reference and owned by the same assignee as the present application. The incorporated applications also describe the different sounds units types, syllable types and phoneme types that may be tested using the diagnostic system since these types of sound units, syllables and phonemes are similar to the types of sound units, syllables and phonemes used in the training tools. Now, more details of the Web-based diagnostic system will be described.

Figure 2:
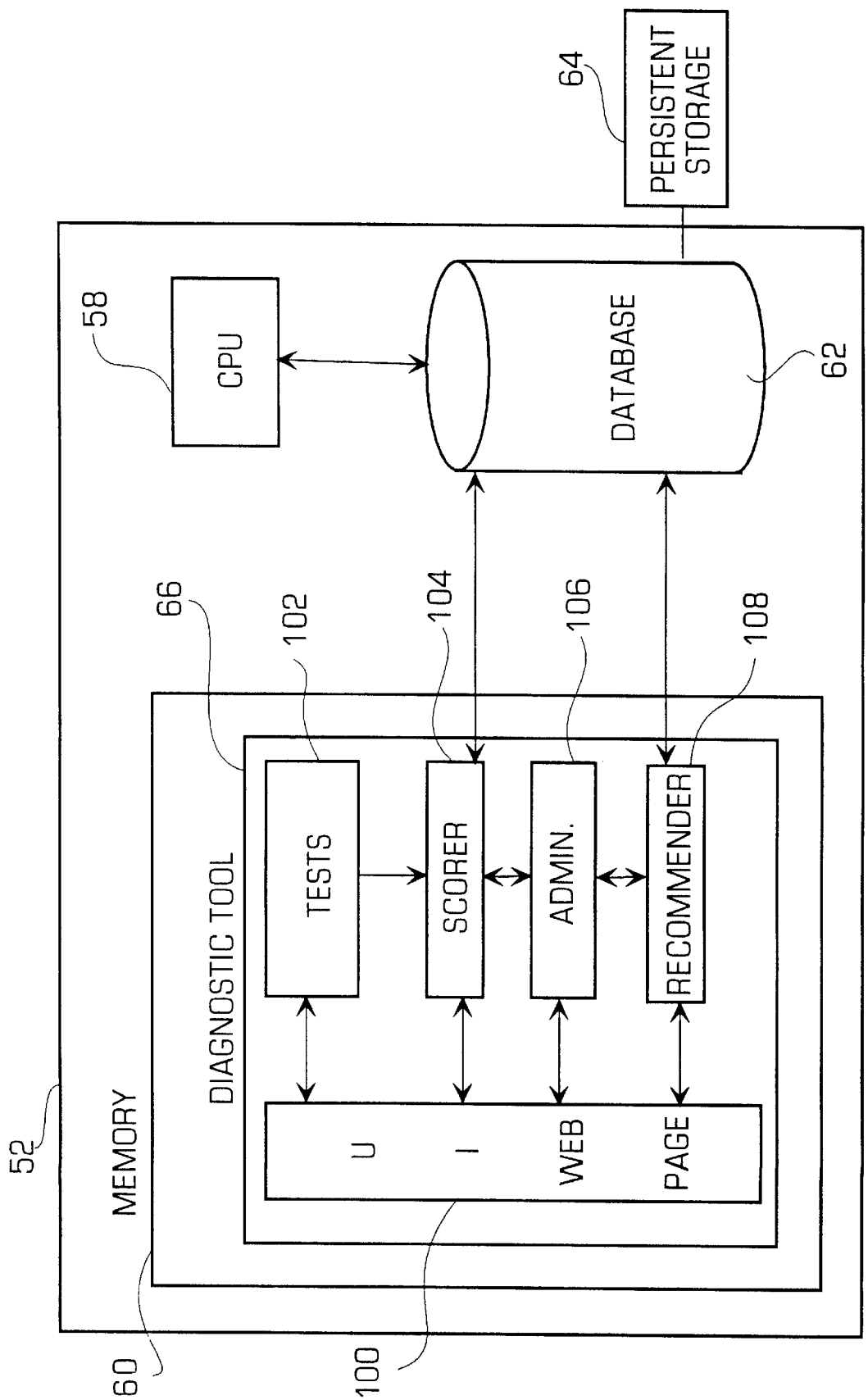
FIG. 2 is a diagram illustrating a Web-based server computer that may be a part of the diagnostic system of FIG. 1.

FIG. 2 is a diagram illustrating the Web-based server computer 52 that may be a part of the diagnostic system of FIG. 1. The server 52 may include the CPU 58, the memory 60, the DB 62, the persistent storage device 64 and the diagnostic tool 66. The diagnostic tool may further comprise a user interface (UI) 100, a test section 102, a scorer 104, an administrator 106 and a recommender 108. The user interface may download the Web pages to each client computer as the Web pages are requested and receive the responses back from the client computers. The test section 102 may contain links to one or more different diagnostic tests (stored in the persistent storage or the DB) that may be used to determine a child's proficiency at a particular phonological awareness skill or reading skill as described in more detail below. Each test may have the child play a graphical game in which some skill of the child is being tested without the child knowing that a test is being performed. This type of game-based testing may reduce the child's anxiety about taking a test. The child may interact with each test and respond to the test with responses. Those responses are uploaded to the server and gathered by the scorer 104. The scorer may accumulate the total score for each test and then store the score in the DB 62. Since the scores from the tests are automatically gathered and stored by the scorer into the DB, the system helps to generate accurate scores, permits the scores from different children to be compared to each other and permit a child's progress to be tracked based on the changing scores of a child over time. The scorer 104 may also include statistical analysis mechanisms for determining various statistics about the scores of one or more children using the diagnostic tool.

The administrator 106 may perform various administrative actions such as monitoring the user of the diagnostic tool, billing the users (if appropriate) and the like. The recommender 108 may use the scores and statistical information generated by the scorer, if requested by the user of the client computer, to recommend one or more training tools that may be used by the child taking the tests on the particular client computer in order to improve the child's ability in any deficient areas. For example, the scores may indicate that the child has weak/below average rhyme recognizing skills and the recommender may recommend that the child play the rhyme recognizer training tool in order to boost the child's rhyme recognition abilities. The parent may then download the training tool from the system. The recommender permits a parent of the child, who has no experience or knowledge about reading disorders or phonological awareness and processing deficits, to have their child tested for these deficits at home and then have the system automatically recommend a training tool that may help the child improve in any deficient areas.

The diagnostic tool may also include speech recognition software that permits the various tests described below, to be used in conjunction with speech recognition technology (a microphone and speech recognition software) on the client computer to enhance the value of the diagnostic tests. For example, the child may see one or more items on the computer screen in rapid succession, speak the name of each item into a microphone that is interpreted by the speech recognition software in the client computer, transmitted to the server and compared to a correct response by the speech recognition software in the server so that the scorer may determine whether or not the child correctly identified each item. The tests that may benefit from the speech recognition technology will be described below. Now, a preferred embodiment of the diagnostic tool in accordance with the invention will be described in more detail.

Figure 3:
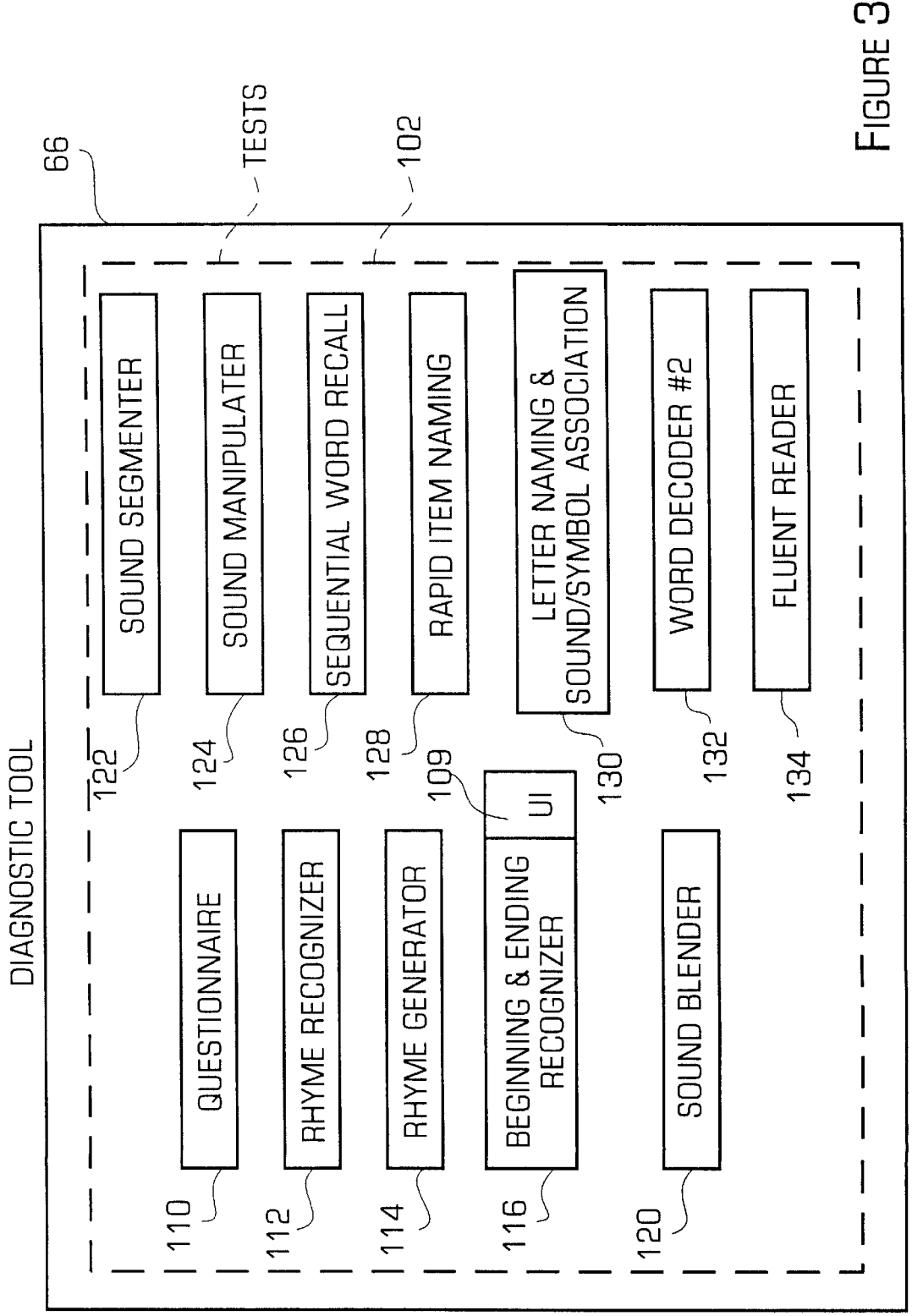
FIG. 3 is a diagram illustrating a preferred embodiment of the diagnostic tool of FIG. 2 in accordance with the invention including one or more tests that are used to diagnose a reading problem of a child.

FIG. 3 is a diagram illustrating a preferred embodiment of the diagnostic tool 66 including one or more tests 102 that are used to diagnose a reading problem of a child by testing various phonological awareness and processing skills and pre-reading skills of the child. In a preferred embodiment, the one or more tests 102 may each be a separate software application module that may include a user interface portion 109 containing one or more Web pages. Each test 102 may display images on the display of the client computer that test a particular phonological awareness skill of the child and receive responses from the child that are used to determine a score for the child In the preferred embodiment, the diagnostic tool may include, for example, a questionnaire module 110, a rhyme recognizer module 112, a rhyme generator module 114, a beginning and ending sound or sound unit recognizer module 116, a sound blender module 120, a sound segmenter module 122, a sound manipulator module 124, a sequential verbal recall module 126, a rapid item naming module 128, a letter naming and sound/symbol association module 130, a word decoder module 132 and a fluent reader module 134. As described above, each module may embody a test that tests a particular phonological or reading skill of the child that may affect the child's ability to read.

The questionnaire 110 is a fill-in form that permits the system to look for particular risk factors that may lead to reading deficiencies as described below with reference to FIG. 4. The rhyme recognizer module 112 determines the child's ability to recognize a rhyme as described below with reference to FIGS. 5 and 6. The rhyme generator module 114 determines the child's ability to make rhymes as described below with reference to FIGS. 7 and 8. The beginning and ending sound or sound unit recognizer module 116 determines the child's ability the recognize the beginning and ending sounds in one or more words as described below with reference to FIGS. 9 and 10. The sound blender module 120 determines the child's ability to blend known sounds or sound units together to form new words as described below with reference to FIGS. 11 and 12.

Figure 14:
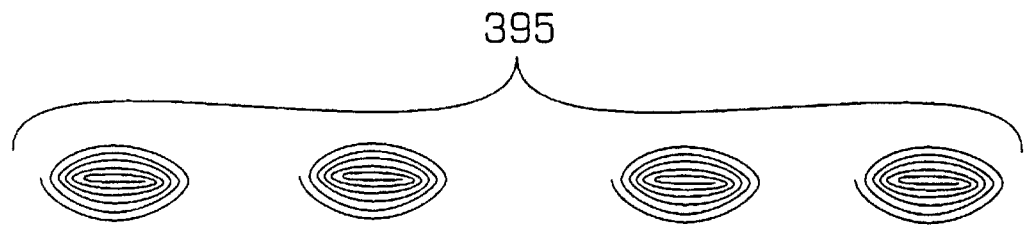
FIG. 14 is a diagram illustrating an example of how the child's ability to segment sounds may be tested in accordance with the invention.

The sound segmenter module 122 determines the child's ability to segment a word into one or more sounds as described below with reference to FIGS. 13 and 14. The sound manipulator module 124 determines a child's ability to manipulate the sounds in a word as described below with reference to FIGS. 15 and 16. The sequential verbal recall module 126 determines the child's ability to recall a series of sequential items shown to the child as described below with reference to FIGS. 17 and 18. The rapid naming module 128 determines a child's ability to rapidly name one or more items as described below with reference to FIGS. 19 and 20. The letter naming and sound/symbol association module 130 determines the child's ability to name the letters of the alphabet and associate sounds with symbols as described below with reference to FIGS. 21 and 22. The word decoding module 132 determines a child's ability to determine words based on one or more sounds as described below with reference to FIGS. 23 and 24. The fluent reader module 134 determines the child's fluent reading ability as described below with reference to FIGS. 25 and 26. As described above and below, each module may use the speech recognition technology to enhance the testing process. Now, each of these modules will be described in more detail starting with the questionnaire.

Figure 4:
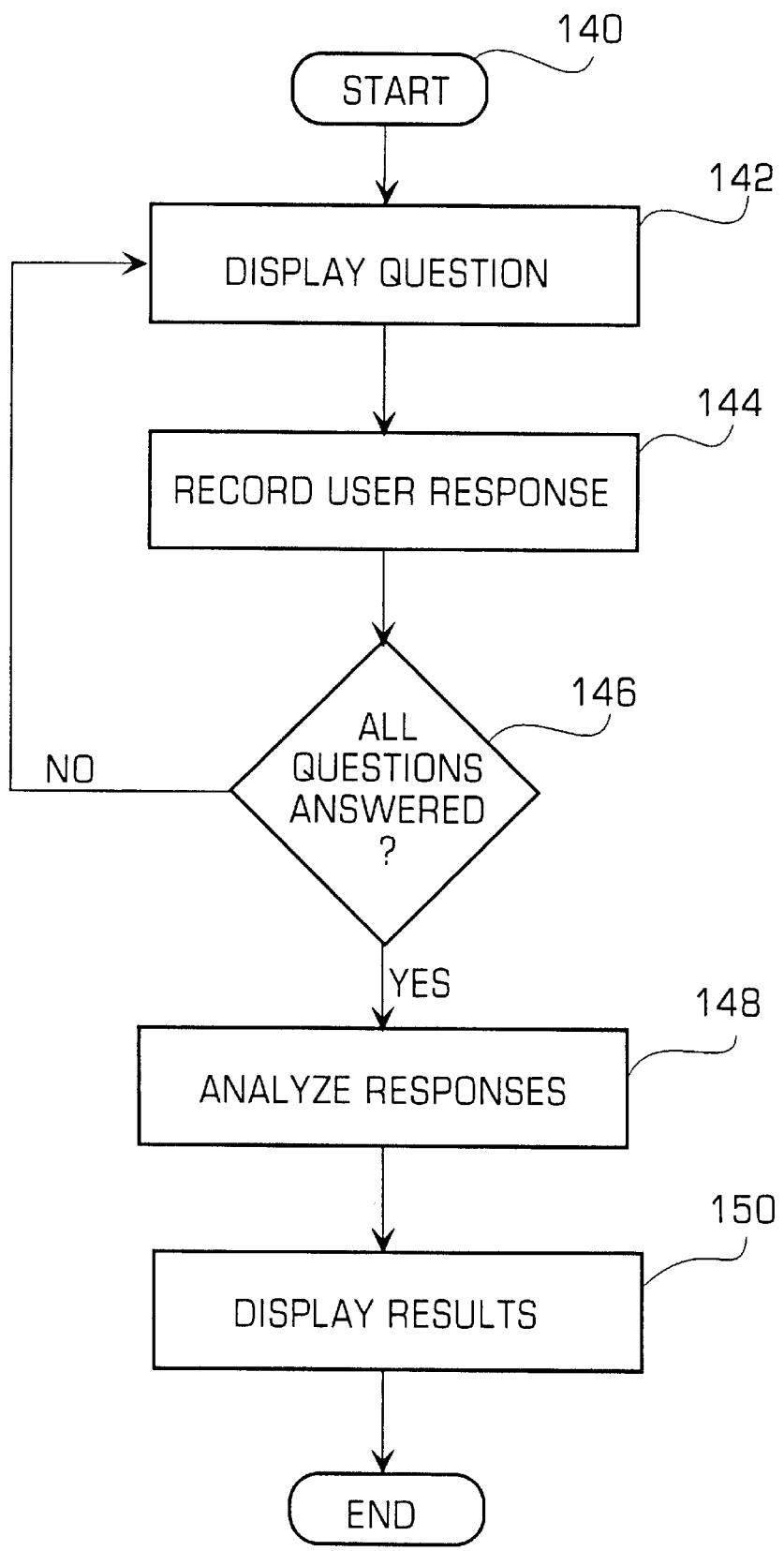
FIG. 4 is a flowchart illustrating filling out a questionnaire in accordance with the invention.

FIG. 4 is a flowchart illustrating a questionnaire process 140 in accordance with the invention. The questionnaire permits the diagnostic system to gather information about an individual to be tested for the purpose of calculating the individual's risk for reading and academic failure. In particular, a variety of historical, environmental, familial and behavioral factors that have been closely linked with and are predictive of language-based reading and learning disorders may be determined. For example, the frequency of middle ear infections, a family history of dyslexia, socioeconomic status, exposure to literacy in the home, competencies in speech sound awareness, word retrieval, verbal memory, speed sound perception and production and language comprehension and expressive language may provide information about an individual's risk for language-based reading and learning problems.

In step 142, the questionnaire may display a first question to the user of the client computer, such as the parent of the child being tested. Next, the user may respond to the question using the user input devices and the user's response may be recorded by the questionnaire module in step 144. In step 146, the questionnaire module determines if all of the questions have been answered and goes to step 142 to present the next question to the user if there are additional questions. As long as there are remaining questions, the method will loop through steps 142–146. When the user has answered all of the questions, the questionnaire module may analyze the responses in step 148 to calculate a score and a risk factor value and then display the results of the analysis (including the responses and the recommendations of the system) to the user in step 150. The score may be calculated as the number of items checked as being applicable to the user. Although a single factor does not indicate a risk, the more factors that exist for an individual, the more likely it is that the individual may experience difficulties.

In analyzing the results of the questionnaire, the module may generate a category of the risk (high, medium or low) and then provide recommendations based on the category of risk. As an example, the questionnaire may ask if the child has a history of middle ear infections, if anyone in the family has reading or other learning disabilities and if the child mispronounces multi-syllabic words. The responses to these questions may be used to determine the category of risk of the person being tested. The category of risk determined based on the questionnaire may then be used during the recommendation of training tools. Now, the rhyme recognition module will be described in more detail.

Figure 5:
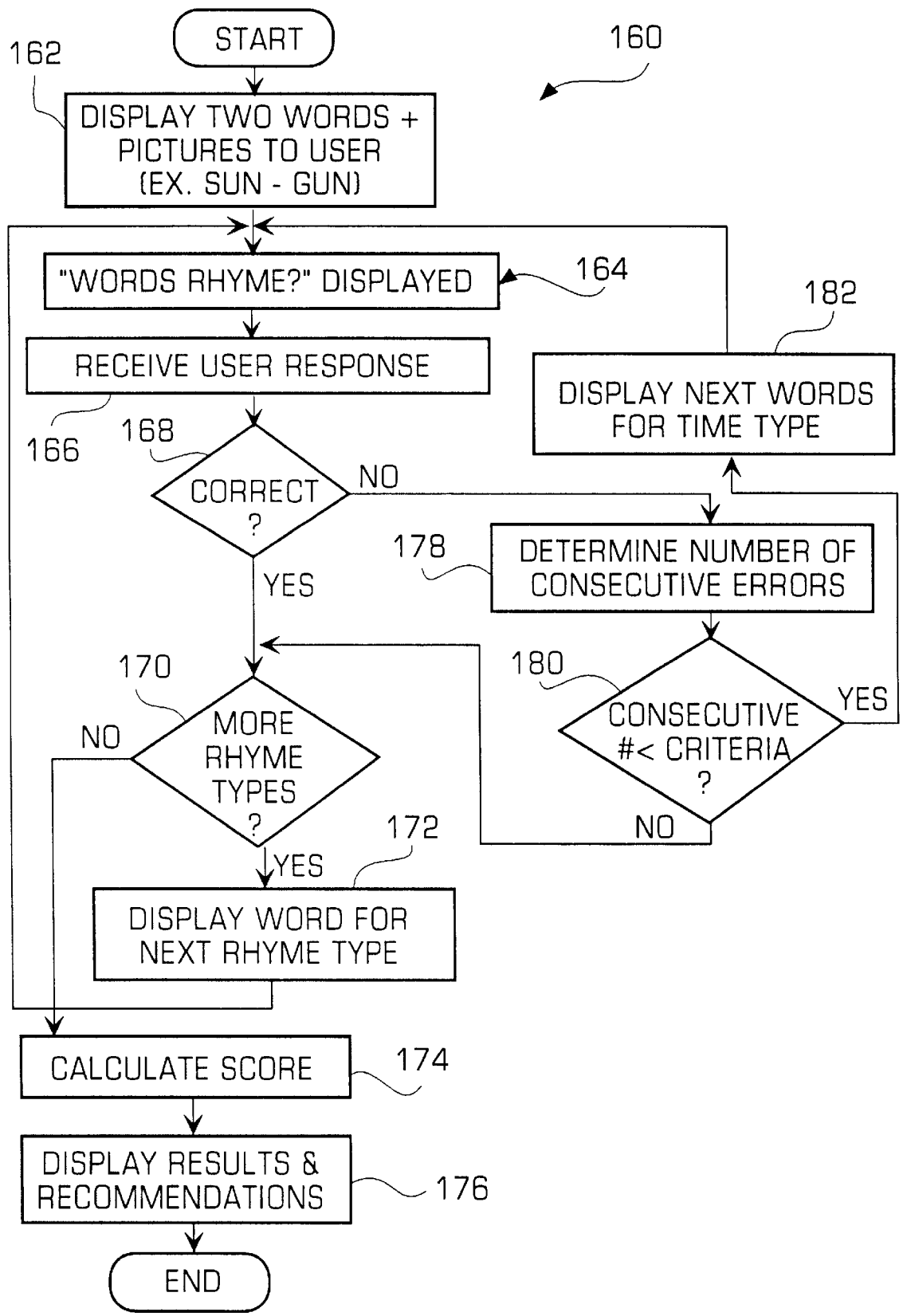
FIG. 5 is a flowchart illustrating a method for testing a child's recognition of rhymes.

FIG. 5 is a flowchart illustrating a method 160 for testing a child's recognition of rhymes in accordance with the invention. The rhyme recognizer module tests the child's ability to recognize rhyming words and, in order to determine if two words rhyme, the child must focus on the sounds of the words rather than the meaning. In addition, the child must focus on one part of the word rather than the word as a whole. A sensitivity to rhyming is typically a child's first experience shifting their attention and focus from the content of the speech to the form of the words. Typically, this skill for recognizing rhymes should emerge by 3–4 years of age. The module may show the child one or more different types of rhymes (using different sound units, for example) in order to assess the child's ability with different types of rhymes.

Figure 6:
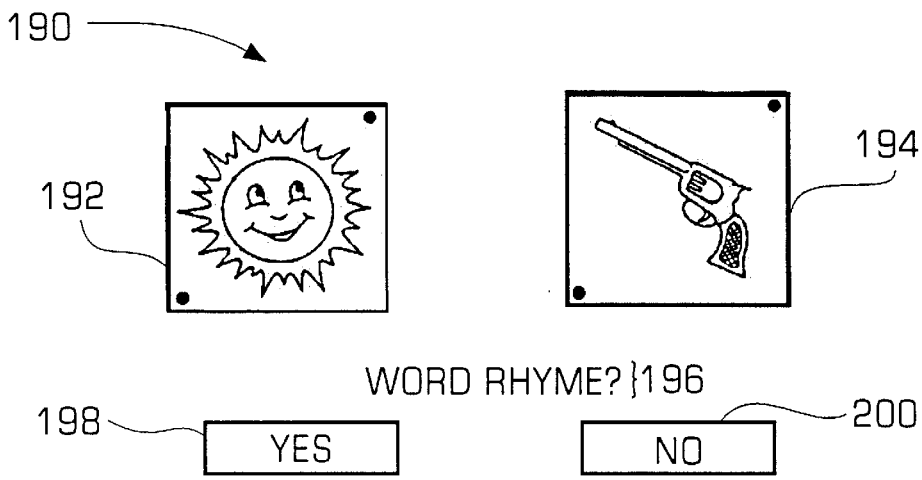
FIG. 6 is a diagram illustrating an example of how the child's rhyme recognition ability may be tested in accordance with the invention.

At step 162, the rhyme recognizing module may display two words along with their pictures on the user's display screen as shown in FIG. 6. For example, the module may display the picture of a sun and a picture of a gun. In step 164, the module may display text below the pictures asking the user if the two words rhyme. In a preferred embodiment, the module may present a verbal prompt asking the user if the two words rhyme since the users of the system may not be able to read. In step 166, the user may use the user input device, such as the keyboard, the mouse or the microphone of the speech recognition hardware, to respond to the question and the module may receive the response. In step 168, the module may determine if the response is correct. If the response is correct, the module may determine if there are other rhyme types to test in step 170. If there are more rhyme types to test, the module may display the word pair for the next type of rhyme in step 172 and loops back to step 164 to display the question about whether the two words rhyme. If there are no more rhyme types to test, the module may calculate the child's score in step 174. The score may be calculated based on the percentage of pairs of items correctly identified as rhyming or not. In step 176, the module may display the score to the user and the recommender, based on the score, may recommend one or more training tools to help the child improve his rhyme identification skills.

Returning to step 168, if the response given by the user is not correct, then the module may determine the number of consecutive errors of the particular rhyme type in step 178. In step 180, the module may compare the number calculated above to a predetermined number and if the number of consecutive errors is more than the predetermined number, the module go to step 170 to determine if there are other rhyme types to be tested (assuming that more tests for the current rhyme types are not productive since the user has already missed more than the predetermined number). If the number of consecutive errors is less than the predetermined number, then the module may display the next word pair for the same rhyme type in step 182 in order to continue testing the child's ability with that particular type of rhyme. In this manner, the rhyme recognizer module may test the child's abilities with respect to a variety of rhyme types to gain a better understanding of the child's deficiencies or abilities to recognize rhymes. For example, the module may determine that the child only has deficiencies with respect to certain types of rhymes. Now, an example of the user interface for the rhyme recognition module will be described.

FIG. 6 is a diagram illustrating an example of how the child's rhyme recognition may be tested in accordance with the invention. In particular, an image 190 that may be displayed on the user's display screen is shown. The image may include a picture of a first item 192 and a picture of a second item 194 and the child must determine if the names of the two items rhyme with each other. In this example, the items are a sun and a gun that do in fact rhyme. The image may also include displayed instructions 196 from the module and one or more response buttons 198, 200, such as the "Yes" button and the "No" button in this example. As described above, the user may also respond to the query by using the keyboard or by speaking into a speech recognition microphone. In accordance with the invention, the rhyme recognition module may present the rhyme recognition test as a series of colorful images that reduces the child's test anxiety since the child may not even realize that he/she is being tested. Now, the rhyme generation module will be described in more detail.

Figure 7:
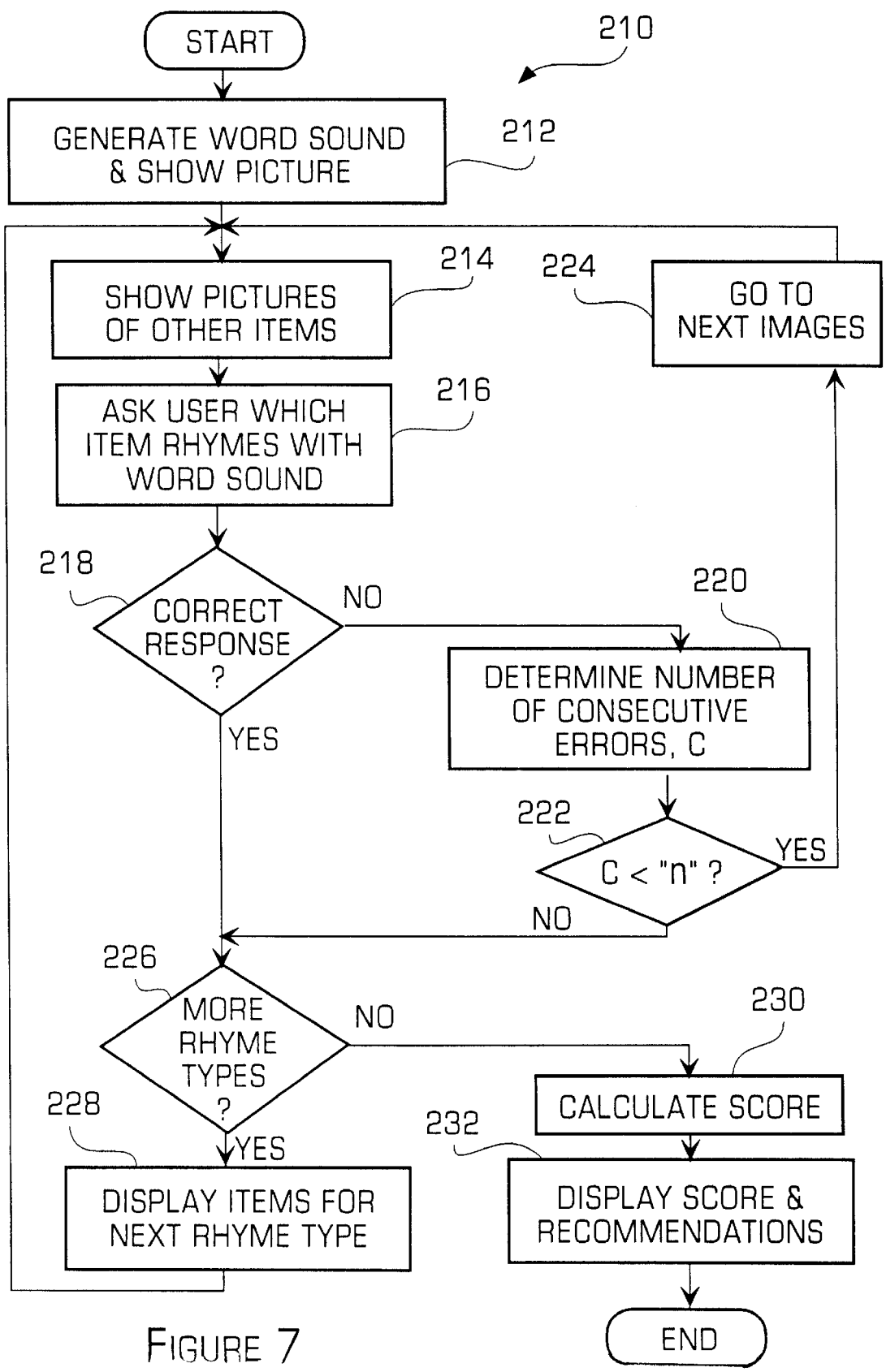
FIG. 7 is a flowchart illustrating a method for testing a child's ability to generate a rhyme.

FIG. 7 is a flowchart illustrating a method 210 for testing a child's ability to generate a rhyme. The rhyme generation module assesses a child's ability to focus on one part of a word rather than the entire word. The ability to rhyme indicates the emergence of phonological awareness and processing skills and is a good early indicator of later reading ability. Typically, this skill begins to show as the child is 3–4 years old.

In step 212, the module may generate a word sound on the speaker of the user's computer and may display an image of the word being spoken. The module may also display a series of other pictures of items in step 214 and the user must determine which item in the series rhymes with the spoken word. The module may then ask the user to select the rhyming item in step 216, the user may provide a response using one of the input devices (keyboard, mouse or microphone). Instead of a series of images being displayed to the user, the module may provide a verbal prompt asking the user to generate a rhyming word and the user may speak the rhyming word into the microphone of the speech recognition device. The module may then determine if the user's response is correct in step 218. If the user's response is not correct, then the module may determine the number of consecutive incorrect responses in step 220 and compare the calculated number to a predetermined number, n, in step 222. If the number of errors is less than the predetermined number (e.g., the user should be tested more on that rhyme type), the module may display the next image in step 224 and return to step 214. If the number of consecutive errors is greater than the predetermined number (e.g., it is no longer useful to continue testing this rhyme pair because the user does not understand it) or the user's response was correct, the module may determine if there are more rhyme types to test in step 226. If there are more rhyme types to test, then the module may display the items for the next rhyme type in step 228 and return to step 214 to elicit the user's response. If there are no other rhyme types (i.e., the user has completed the module), the module may calculate a score in step 230 (the score is equal to the percentage of items correctly identified as rhyming) and may display the results of the test and any recommendations from the recommender in step 232. The recommendations from the recommender are similar to those described above and therefore will not be described here. Now, an example of the rhyme generation test is described.

Figure 8:
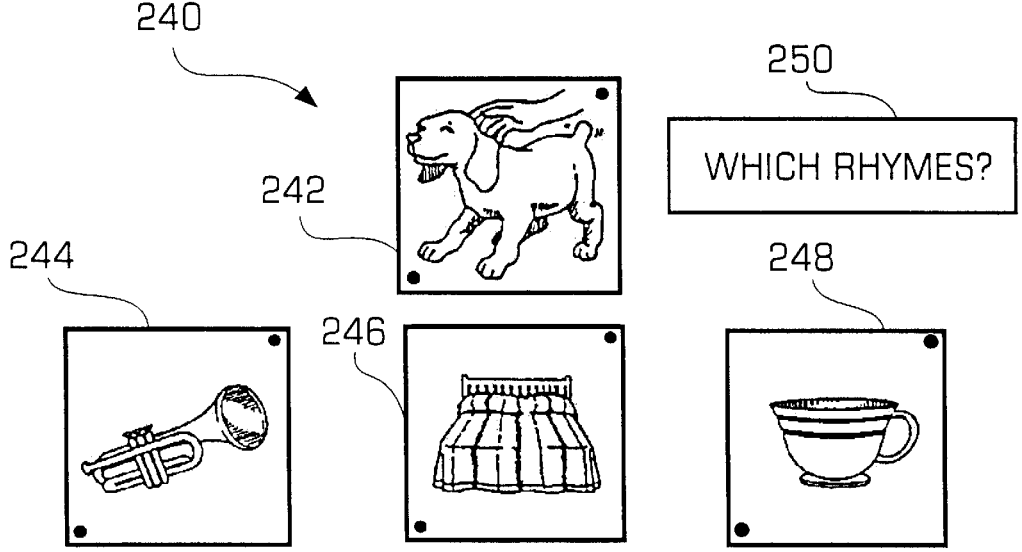
FIG. 8 is a diagram illustrating an example of how the child's rhyme generation ability may be tested in accordance with the invention.

FIG. 8 is a diagram illustrating an example of how the child's rhyme generation may be tested in accordance with the invention using an image 240. The image may include an image 242 of the spoken word that may be a "pup" in this example. The image 240 may also include one or more images of other items 244–248 (a horn, a bed and a cup in this example) and displayed instructions 250 as shown. During the test, the user may hear the word "pup", see the picture of the "pup" and select the item below it that rhymes with the pup. In this example, the user is supposed to select the picture of the cup. As above, instead of a series of images being displayed to the user, the module may provide a verbal prompt asking the user to generate a rhyming word and the user may speak the rhyming word into the microphone of the speech recognition device. As above, the use of images to test the child's ability reduces the child's test anxiety since the child may not even realize that a test is being conducted. Now, more details of the beginning and ending sound recognizer module will be described.

Figure 9A:
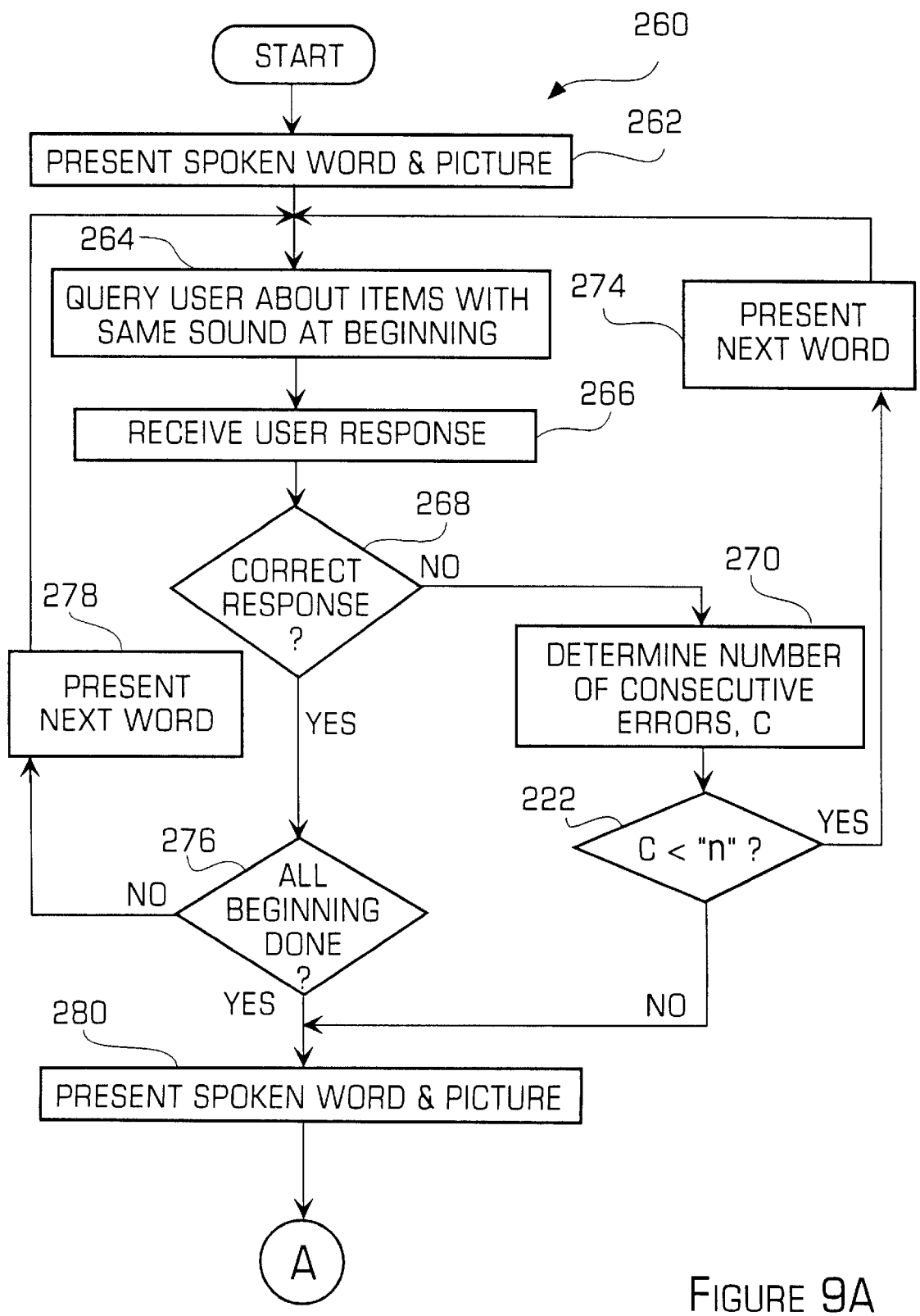
FIG. 9 is a flowchart illustrating a method for testing the child's ability to distinguish the beginning and ending sounds of a word.
Figure 9B:
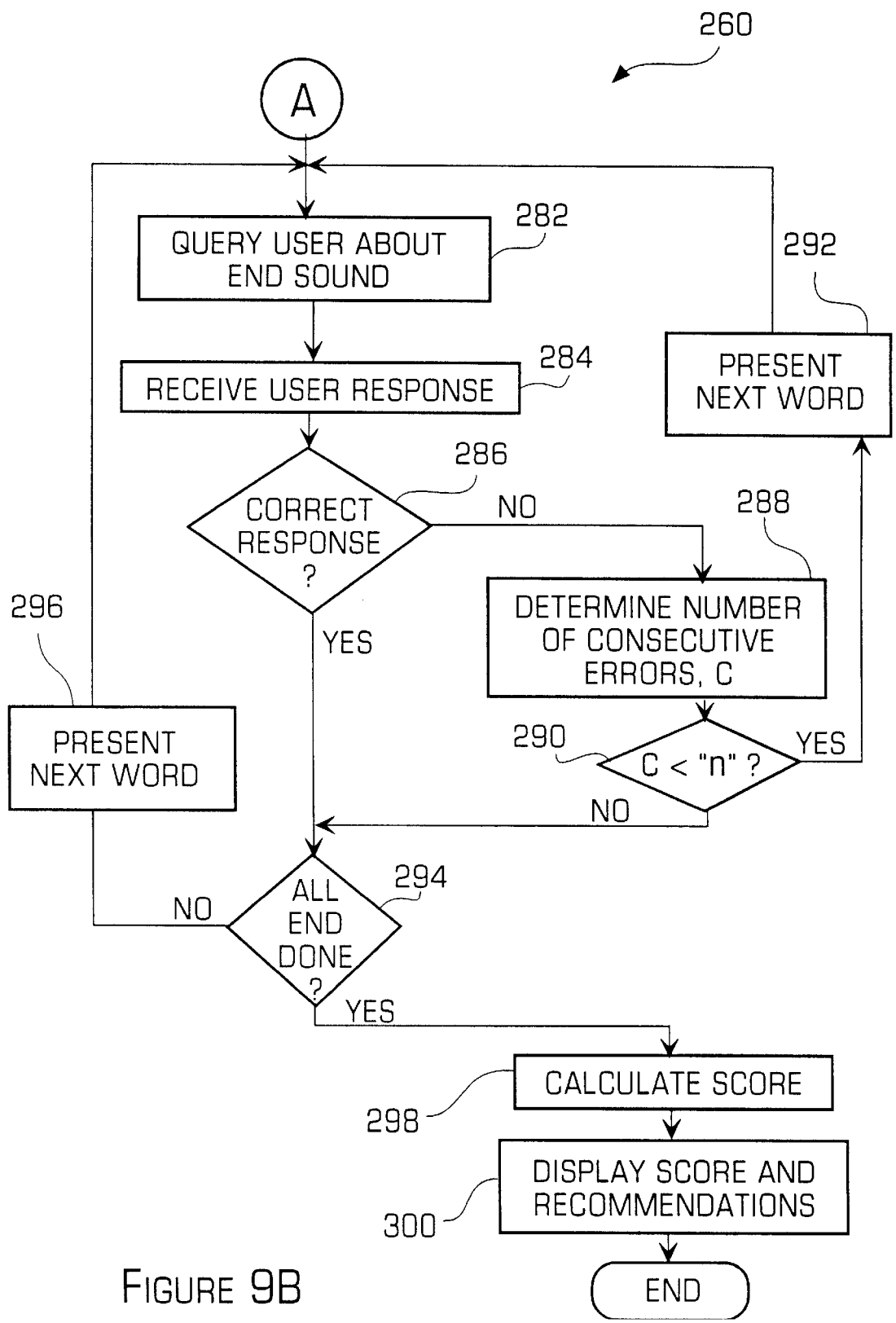

FIG. 9 is a flowchart illustrating a method 260 performed by the beginning and ending sound recognizer module for testing the child's ability to distinguish the beginning and ending sounds of a word. In particular, the module tests a child's ability to recognize sounds in words. Once the child establishes the skill to recognize the beginning and ending sounds of a word, the child may more readily learn to isolate the sounds in a word and hear them separately. A normal kindergarten child is typically able to identify which word in a group of three words begins with the same first sound as the target word. Most normal first grade students can perform the harder task of identifying the word in a group with the same last sound.

In step 262, the module may present a spoken word naming an item and display an image of the item to the user. In step 264, the module may query the user about which item in a sequence of items has the same beginning sound as the item. The module may then receive a user's response from the user entering the response into the input devices as described above in step 266. In step 268, the module determines if the response is correct. If the response is not correct, the module may determine the number of consecutive errors for the particular beginning sound in step 270 and compare the calculated value with a predetermined value, n, in step 272. If the calculated value is not less than the predetermined value (i.e., the user should be asked more questions about that particular type of beginning sound), then the module may present the user with another spoken word and picture in step 274 and return to step 264 to gather the user's response.

Returning to step 268, if the response of the user is correct, the module determines if all of the beginning sounds in the test are completed in step 276 and either presents the next beginning sound in step 278 and returns to step 264 if there are other beginning sounds to test or begins testing the ending sounds. In particular, the module may present a spoken word and a picture of the item in step 280 and query the user about which item in a sequence of items has a similar ending sound in step 282. In step 284, the module may gather the user's response and determine if the response is correct in step 286. If the response is incorrect, the module may determine the number of consecutive errors for the particular ending sound in step 288, compare the calculated number to a predetermined number in step 290 and display a next word in step 292 and returns to step 282 if the calculated number is less than the predetermined number. If the calculated number is not less than the predetermined number or the user's response is correct, the module may determines if the ending sounds has been completed in step 294. If the testing of the ending sounds has not been completed then the module may present the next word in step 296 and return to step 282. If the ending sounds are completed, the module may calculate a score based on the percentage of correct responses in step 298. In step 300, the module and the recommender, respectively, may generate a display of the score and any recommendations about training tools that the user may use to improve his recognition of the beginning and ending sounds of a word. Now, an example of the user interface for testing the ability to discern the beginning and endings of words will be described.

Figure 10:
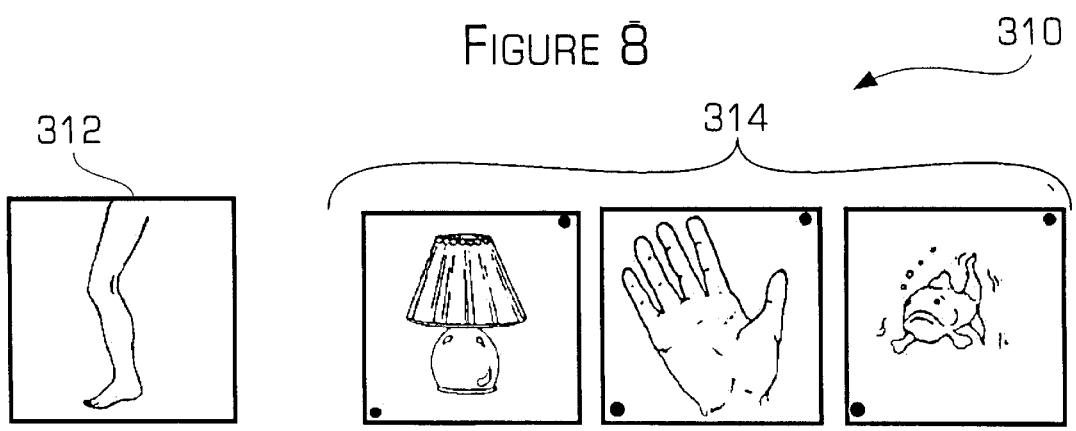
FIG. 10 is a diagram illustrating an example of how the child's ability to discern the beginning and ending of words may be tested in accordance with the invention.

FIG. 10 is a diagram illustrating an example of a user interface 310 of how the child's ability to discern the beginning and ending of words may be tested in accordance with the invention. In particular, the user interface may include a picture of the current word 312 that is a leg in this example, and a series of pictures 314 showing other items. The user must recognize the beginning sound of the leg and then determine which picture of an item shows an item with the same beginning sound. The user may then select an item by clicking on the item. In this example, the correct response is the lamp. Now, a method for testing a child's ability to blend sounds will be described.

Figure 11:
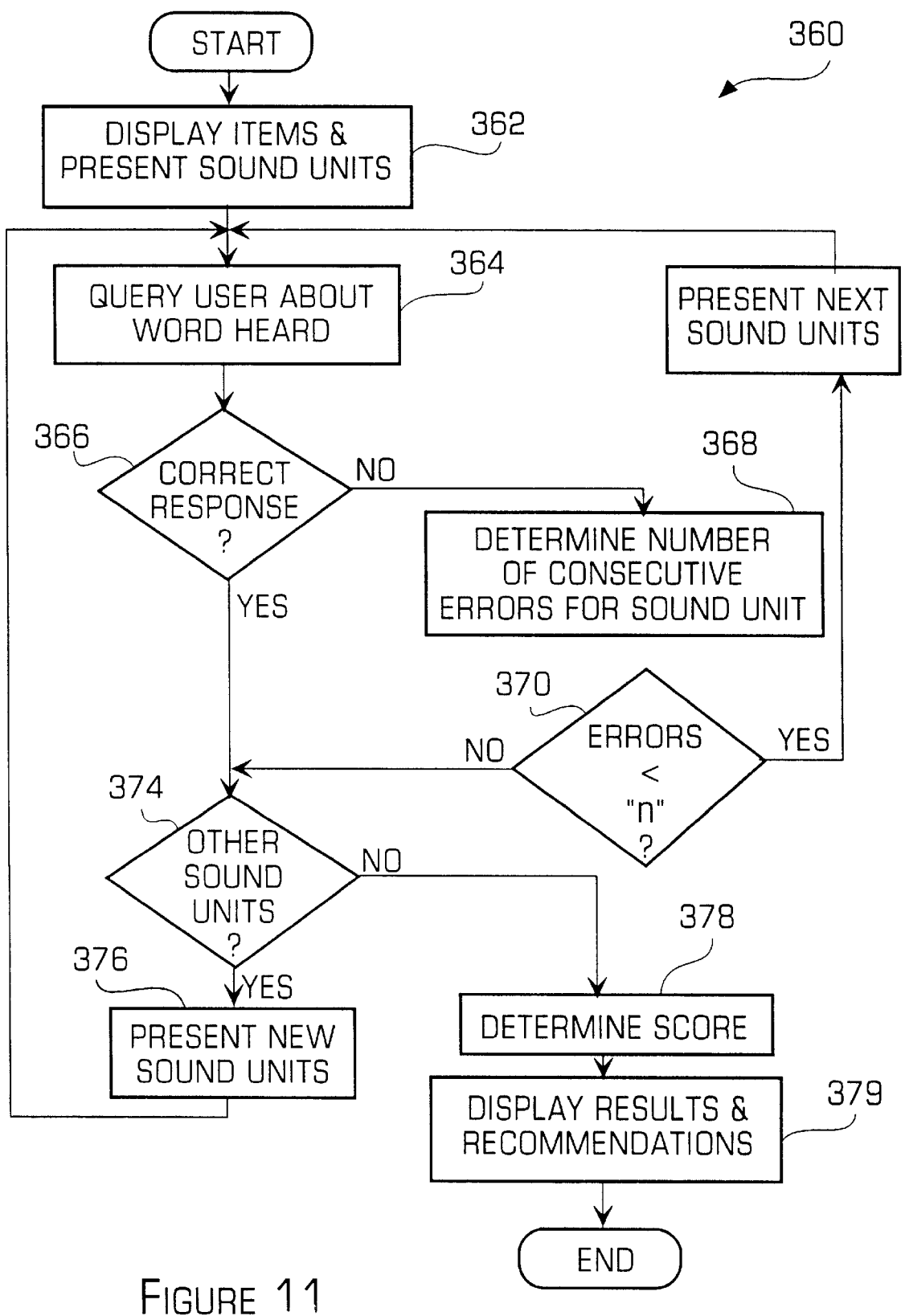
FIG. 11 is a flowchart illustrating a method for testing a child's ability to blend sounds.

FIG. 11 is a flowchart illustrating a method 360 for testing a child's ability to blend sounds. In particular, the game tests the user's ability to blend units of sound such as syllables or phonemes together. The blending of these units of sound together requires a knowledge that individual sounds may be combined to form a word, but does not require letter recognition. The blending of sounds is an important reading skill since, when children sound out a word, they must be able to then blend all of the sounds together to form the whole word. Typical children normally develop the blending skill during the early kindergarten years.

In step 362, the module may display one or more graphical representations of items and present a spoken word, with its sound units separated by equal intervals of time, to the user, such as "k-ey". The module may then ask the user to identify the graphical item referred to by the spoken word in step 364 and receive the response from the user using one of the input devices, such as the keyboard, mouse or microphone of the speech recognizer. In step 366, the module may determine if the response received is correct. If the response was not correct, the module may determine the number of consecutive errors for the current sound unit in step 368. In step 370, the module may determine if the number of consecutive errors is less than a predetermined threshold and present the next word with similar sound unit types in step 372 and loop back to step 364 if the number of consecutive errors is not less than predetermined threshold. If the number of consecutive errors is not less than the predetermined threshold or if the prior response was correct, the module may determine if there are other sound unit types to test in step 374. If there are other sound unit types, the module may present a word with sound units of the new type in step 376 and loop back to step 364 to test the child using the new sound unit type. If there are no more sound unit types to test, the module may determine the user's score in step 378 based on the percentage of correctly answered items. In step 379, the module may display the score to the user and the recommender may recommend one or more training tools that may help the user improve the blending sound ability and that may be downloaded from the diagnostic system. An example of the user interface for testing the blending of sounds will now be described.

Figure 12:
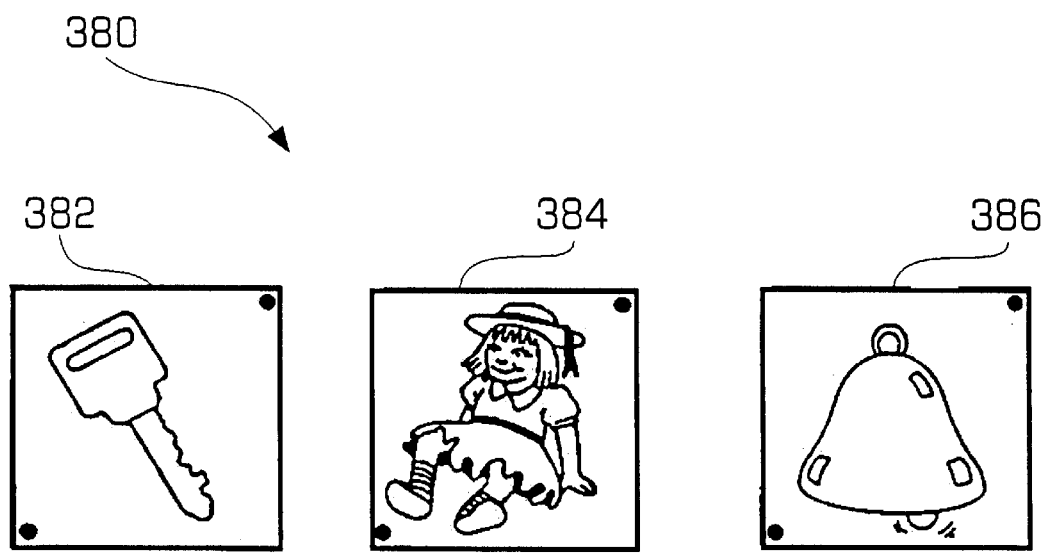
FIG. 12 is a diagram illustrating an example of how the child's ability to blend sounds may be tested in accordance with the invention.

FIG. 12 is a diagram illustrating an example of a user interface for testing a child's ability to blend sounds 380 in accordance with the invention. As shown, the user interface 380 may include graphical representations 382–386 of one or more items, such as a key, a doll and a bell in this example, that the user may select in response to the spoken word's separated sound units. As described above, the user may respond to the questions by clicking on the image, pressing a key on the keyboard or speaking a name into the microphone of the speech recognizer. In this example, the correct response is to select the key 382. Now, a method for testing the sound segmenting ability of a user will be described.

Figure 13:
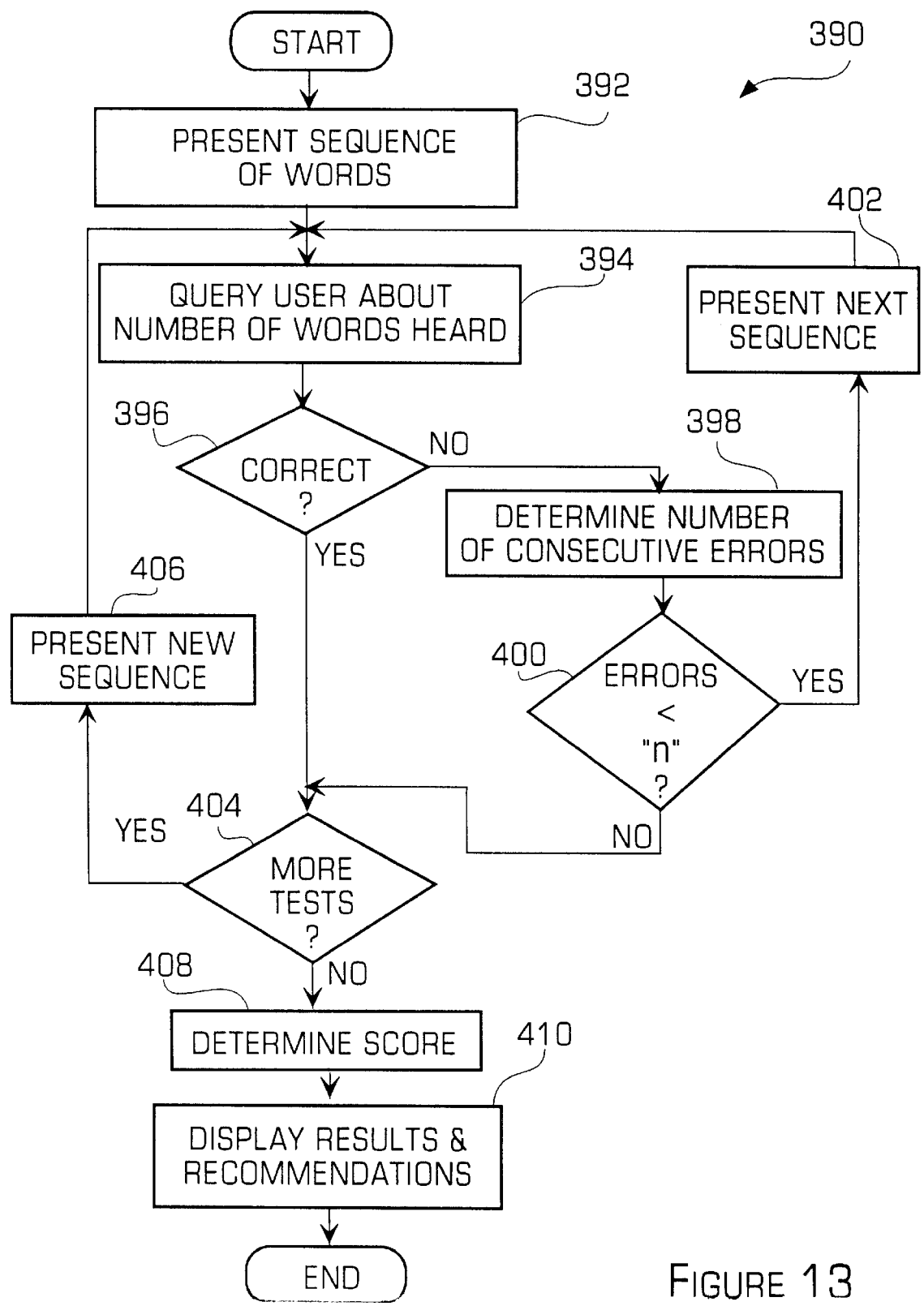
FIG. 13 is a flowchart illustrating a method for testing a child's ability to segment sounds.

FIG. 13 is a flowchart illustrating a method 390 for testing a child's ability to segment sounds in which the user's ability to segment a unit of sound, such as a word, into its constituent units, such as syllables and phonemes, is tested. The ability to segment phonemes is a reliable predictor of reading success and usually is developed prior to and during kindergarten. In step 392, a sequence of sounds units, such as a sentence, is spoken to the user. In step 394, the user is queried about how many words the user heard and the response from the user may be shown graphically as shown in FIG. 14. In the example shown in FIG. 16, the sentence "I have two brothers" was presented to the user, the user activated an input device (clicked the mouse button, hit a key or spoke into the microphone) four times to indicate that four words were heard, and four items 395 are shown on the display.

Returning to FIG. 13, the accuracy of the user's response is checked in step 396. If the response is not correct, the number of consecutive errors is determined in step 398 and compared to a threshold value in step 400. If the number of errors is less than the threshold, the next sequence of sounds units is presented to the user in step 402 and the method loops back to step 394. If the number of errors is not less than the threshold or the prior response of the user was correct, it is determined if there are more tests with a different sequence of sound units in step 404. If there are more tests, a new sequence of sound units is presented in step 406 and the method loops back to step 394. If all of the tests have been completed, then the user's score is determined (as a percentage of correct responses) in step 408 and the score and any recommendations based on the score are displayed in step 410. Now, a method for testing a child's ability to manipulate sounds is described.

Figure 15:
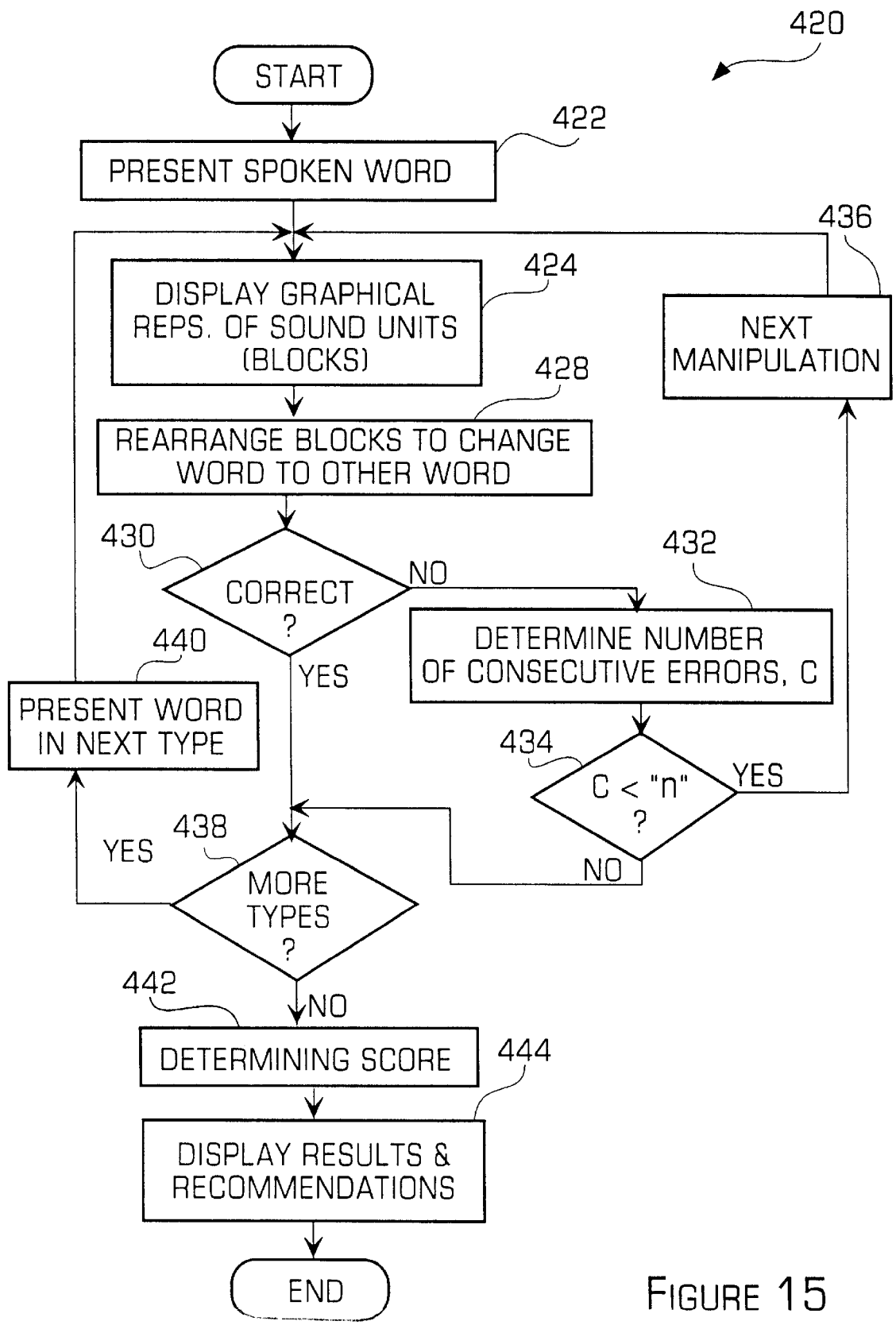
FIG. 15 is a flowchart illustrating a method for testing a child's ability to manipulate sounds.

FIG. 15 is a flowchart illustrating a method 420 for testing a child's ability to manipulate sounds. In particular, the user's ability to manipulate phonemes is tested since that ability is highly correlated with reading ability through the $12^{th}$ grade. In step 422, the user is presented with a spoken word. In the example shown in FIG. 16, the spoken word is "cake". In step 424, a graphical representation of constituent sound units is displayed for the user. In the example shown in FIG. 16, the graphical representations may be one or more blocks 426 (three for the word "cake" with the first and last blocks being the same color since the first and last sound units of "cake" have the same sound). In step 428, the user is asked to rearrange the blocks shown or use the available other blocks (as shown in FIG. 16) to form a new word and the user rearranges the blocks with an input device. In the example, the user is asked to change "cake" to "cape". A correct response would be to have three blocks wherein a third block 429 has a color that does not match the other two blocks indicating that the third sounds unit is different from both the first and second sound units. In step 430, the accuracy of the response is determined. If the response is not correct, the number of consecutive errors is determined in step 432 and compared to a threshold value in step 434. If the threshold value is not exceeded (indicating that the same type of manipulation should continue to be tested), the next manipulation of the same type is presented in step 436 and the method loops back to step 424. If the number of errors exceeds the threshold (indicating that the child is having too much trouble with the current type of manipulation) or if the prior response was correct, it is determined if there are more types of manipulations to test in step 438. If there are more types to test, the next type of manipulation is presented in step 440 and the method loops back to step 424. If there are no more types of test, the score of the user is determined in step 442 (based on the percentage of correct answers) and the score and any recommendations are displayed to the user in step 444. Now, a method for testing the ability to recall spoken words will be described.

Figure 17:
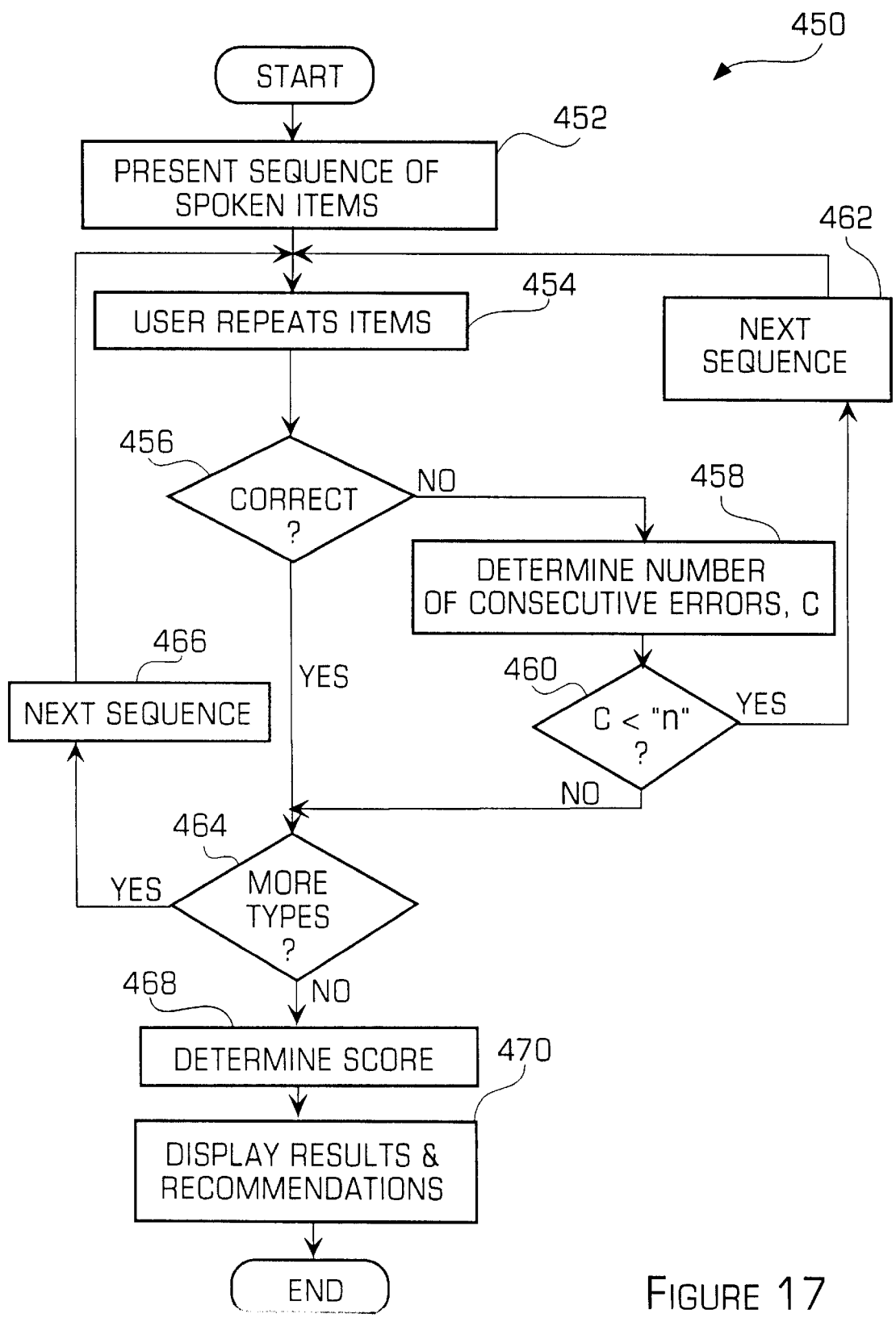
FIG. 17 is a flowchart illustrating a method for testing a child's ability to recall spoken items in sequential order.

FIG. 17 is a flowchart illustrating a method 450 for testing a child's ability to recall spoken items in sequential order. The ability to recall a sequence of verbal material depends on the ability to accurately represent the essential phonological features of each item in working memory and phonological coding efficiency is a primary determinant of performance of this task. Typically, the ability to recall a list of spoken items increases with age from about 1 digit and 2 words at 4 years old to 8 digits and 6 words at 12 years old. In step 452, a sequence of words and/or digits is spoken with equal intervals between each word or digit through the speaker of the computer to the user. The user then repeats the sequence back using an input device such as a microphone of the speech recognizer in step 454. FIG. 18 illustrates an example of a sequence of digits that are presented to the user. In step 456, the response is checked for accuracy.

If the response is not correct, then the number of consecutive errors is determined in step 458 and the number of consecutive errors is compared to a threshold in step 460. If the threshold is not exceeded, then the next sequence of words and/or digits is presented in step 462 and the method loops back to step 454. If the threshold is exceeded or if the last response was correct, it is determined if there are more types of sequence of words to test in step 464 and the method presents a new type of sequence in step 466 and loops back to step 454 if there are more types. If all of the types of sequences have been completed, then the user's score is determined in step 468 (as a percentage of correct responses) and the scope and any recommendations for training modules is displayed in step 470. Now, a method for testing rapid naming ability will be described.

Figure 19:
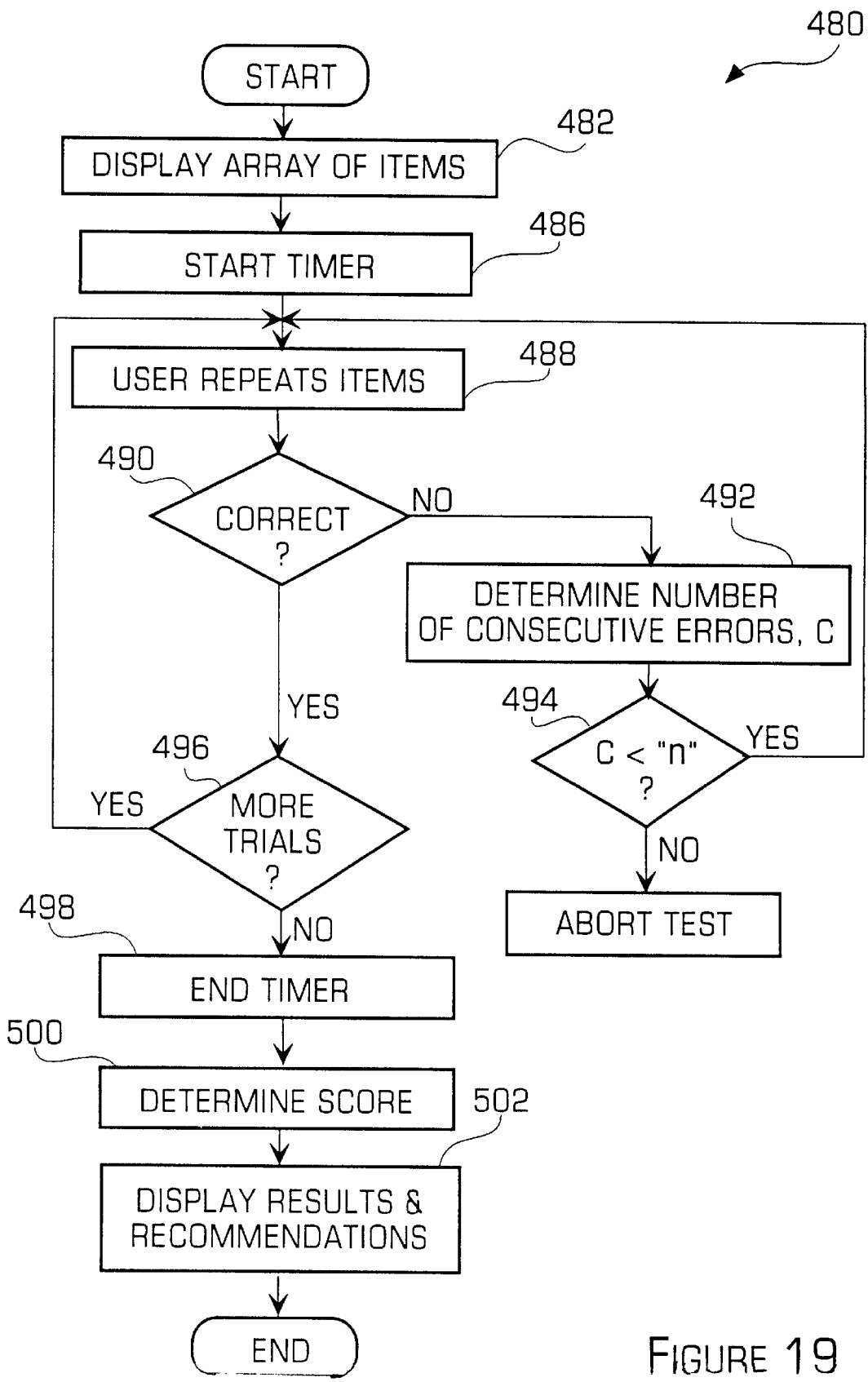
FIG. 19 is a flowchart illustrating a method for testing a child's ability to rapidly name visually-presented items.

FIG. 19 is a flowchart illustrating a method 480 for testing a child's ability to rapidly name visually-presented items. In particular, an inability to name visual objects typically underlies a reading disorder. In step 482, an array 484 (an example of which is shown in FIG. 20 as a first row of a 4×6 array) is displayed to the user. In step 486, a timer is started and the user is asked to name all of the items in the array as fast as possible in step 488 using an input device such as a microphone of a speech recognizer. The timer may actually be started when the user makes his/her first response. After each response, the accuracy of the response is determined in step 490. If the response is not correct, then the number of consecutive errors is determined in step 492 and compared to a threshold in step 494. If the threshold is exceeded, the test is aborted. If the threshold is not exceeded, then the user continues to identify the items in the array. If the prior response was correct, then it is determined if there are more items to name in step 496 and the method loops back to step 488 if there are more items. If all of the items have been named, then the timer is stopped in step 498 and the score is determined in step 500 based on the total time of the responses. In step 502, the score and any recommendations for training modules are displayed. Now, a method for testing the ability to name letters and associate sounds with symbols will be described.

Figure 21:
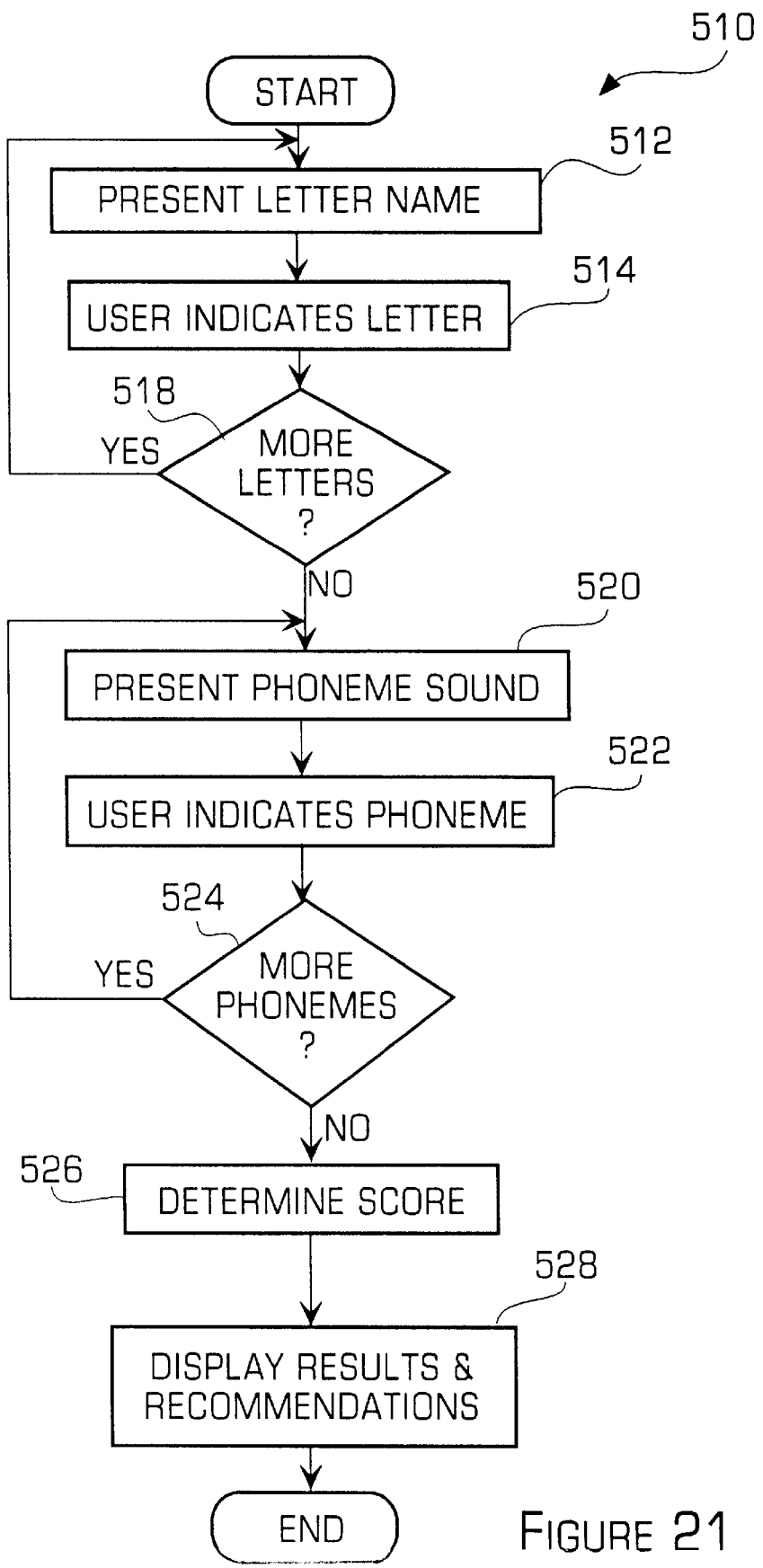
FIG. 21 is a flowchart illustrating a method for testing a child's ability to name letters and associate sounds with symbols.

FIG. 21 is a flowchart illustrating a method 510 for testing a child's ability to name letters and associate a phoneme sound with a letter. The inability to name letters may indicate a reading problem at the kindergarten level while an inability to associate a phoneme sound with a letter may indicate a reading problem at the first and second grade level. In step 512, a letter's name is spoken to the user by the computer. In step 514, the user may identify the letter in an array of letters 516 (as example of which is shown in FIG. 22) and select the appropriate letter using an input device. In step 518, the response accuracy is determined and it is determined if there are more letters. If there are more letters, the method loops back to step 512. If all of the letters have been completed, then a phoneme sound is generated by the computer and heard by the user in step 520. The user may then indicate the corresponding letter for the phoneme sound in step 522 and the accuracy of the response is checked. In step 524, it is determined if there are more phonemes to test and the method loops back to step 520 if there are more phonemes. If the phonemes have been completed, then the user's score is determined in step 526 and the score and any recommendations about training modules is displayed in step 528. Now, a method for testing a child's ability to decode words will be described.

Figure 23:
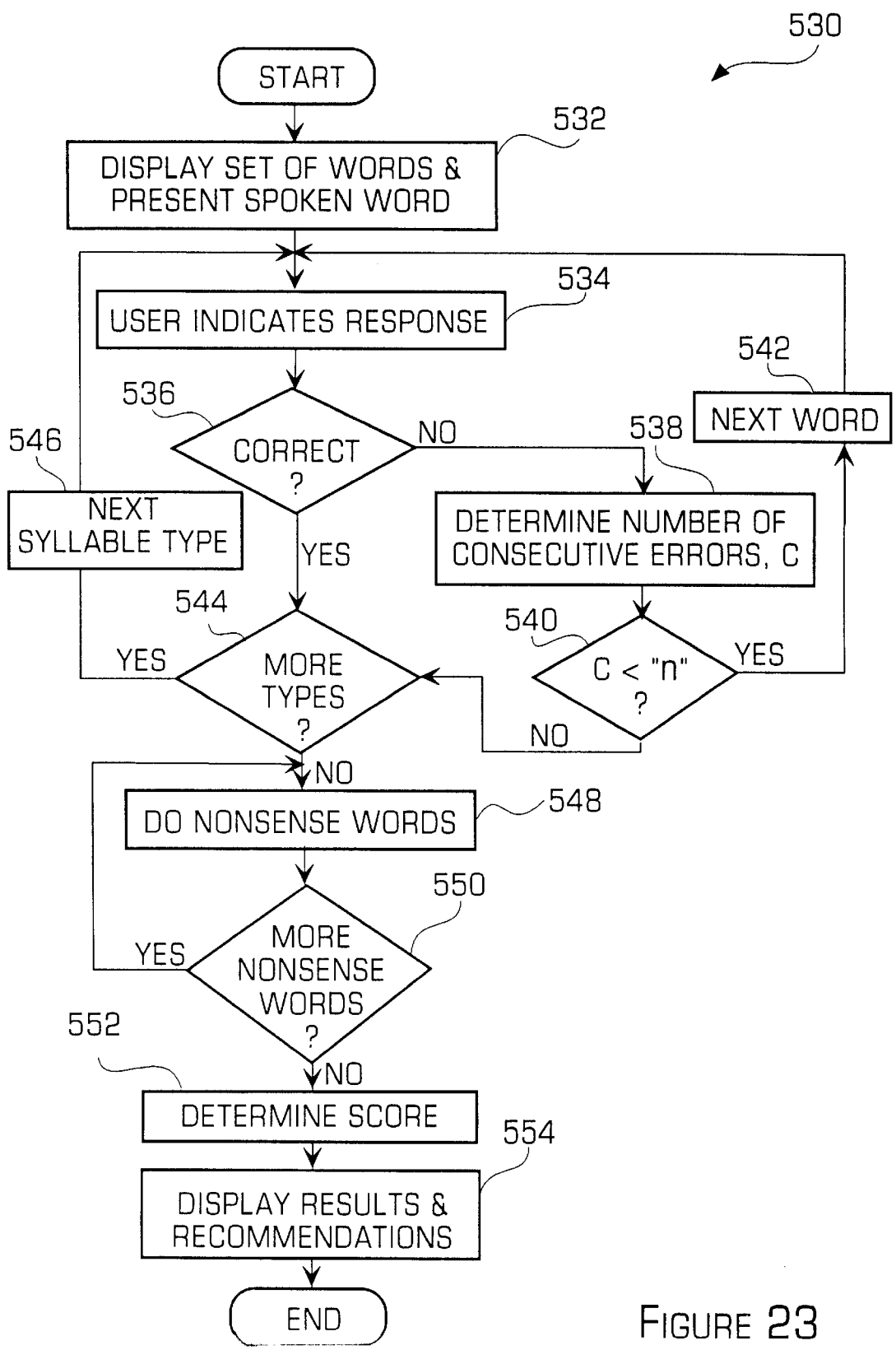
FIG. 23 is a flowchart illustrating a method for testing a child's ability to decode words.

FIG. 23 is a flowchart illustrating another method 530 for testing a child's ability to decode words. In particular, the method tests a child's ability to decode (i.e., read by sounding out) nonsense and real words since research has shown that the best measure of the ability to apply knowledge about grapheme -phoneme correspondences to reading words is a test of non-word phonemic decoding fluency.

At step 532, the module may display a set of words 533 on the screen (an example of which is shown in FIG. 24) and then present a spoken word. In step 534, the module asks the user to identify the written word that was just spoken to the user. As above, the user's response may be provided using one of the input devices, such as the keyboard, mouse or microphone of the speech recognizer. Instead of speaking the word to the user, the module may present the word to the user is a visual manner. In step 536, the module determines if the correct response was received. If the response was not correct, then the module may determine the number of consecutive errors for the particular syllable type in step 538 and compares that calculated value to a predetermined threshold value in step 540 to determine if the calculated value is less than the threshold value. If the calculated value is less than the threshold, then the next spoken word for the same syllable type is presented in step 542 and the method loops back to step 534 to determine the user's response. If the number of consecutive errors is greater than the threshold or the prior response was correct, the module may determine if there are more syllable types to be tested in step 544. If there are more syllable types to test, the module presents the next word for the next syllable type in step 546 and loops back to step 532 where a new spoken word is presented to the user. If there are no more syllable types to test, the module may repeat the above testing (not shown in the flowchart for clarity reasons) process for one or more nonsense words in step 548. Once the above testing process has been repeated for nonsense words by testing if it is completed in step 550 and looping back to step 548, the module may determine the score of the child in step 552 wherein the score is calculated as a percentage of items that have been correctly answered. In step 554, based on the score, the module may display the score and the recommender may recommend one or more training tools to improve the child's decoding skills if the score reveals a decoding deficiency. Now, a method for testing fluent reading will be described.

Figure 25:
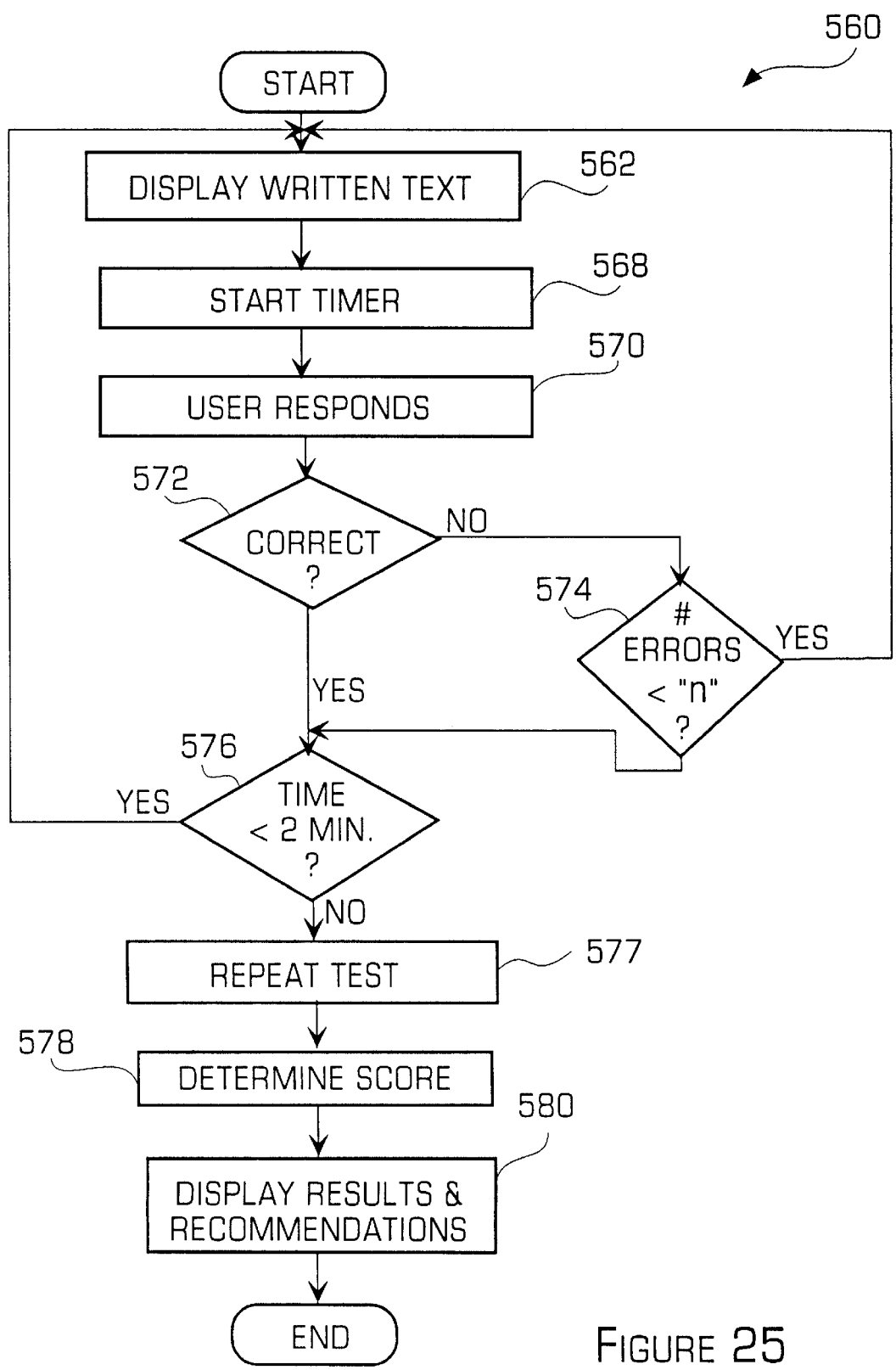
FIG. 25 is a flowchart illustrating a method for testing a child's ability for fluent reading.

FIG. 25 is a flowchart illustrating a method 560 for testing a child's ability for fluent reading. Slow or inaccurate decoding interferes with the ability of the child or user to extract meaning from the text. A typical child may read and respond to 30 sentences of the nature presented in this diagnostic tool in two minutes. The sentences may be questions ("Is the dog red?") or statements ("The dog has fur.") to which the user responds. In step 562, a question 564 is displayed to the user along with two answers 566 (an example of which is shown in FIG. 26). A timer is started in step 568 as the user makes his first response in step 570. In step 572, the accuracy of the response is determined. If the response is not accurate, then the number of errors made is compared to a threshold in step 574. If the number of errors are less than the threshold, then the method loops back to step 562 to continue testing. If the number of errors are more than the threshold or the prior response was correct, it is determined if the time exceeded two minutes in step 576. If the time is less than two minutes, then the method loops back to step 562. If the time exceeds two minutes, the total number of correct responses is tallied and then the entire test is repeated in step 577 and the score of the user is determined in step 578. The total score of the user is calculated by determining the user's score for each two minute test and then averaging the scores from the two tests to arrive at a final score. For example, a user may score 30 on the first test and 28 on the second test so that the final score is 29. In step 580, the score and any recommendations of training modules is displayed to the user. Now, the training module recommender in accordance with the invention will be described.

Figure 27:
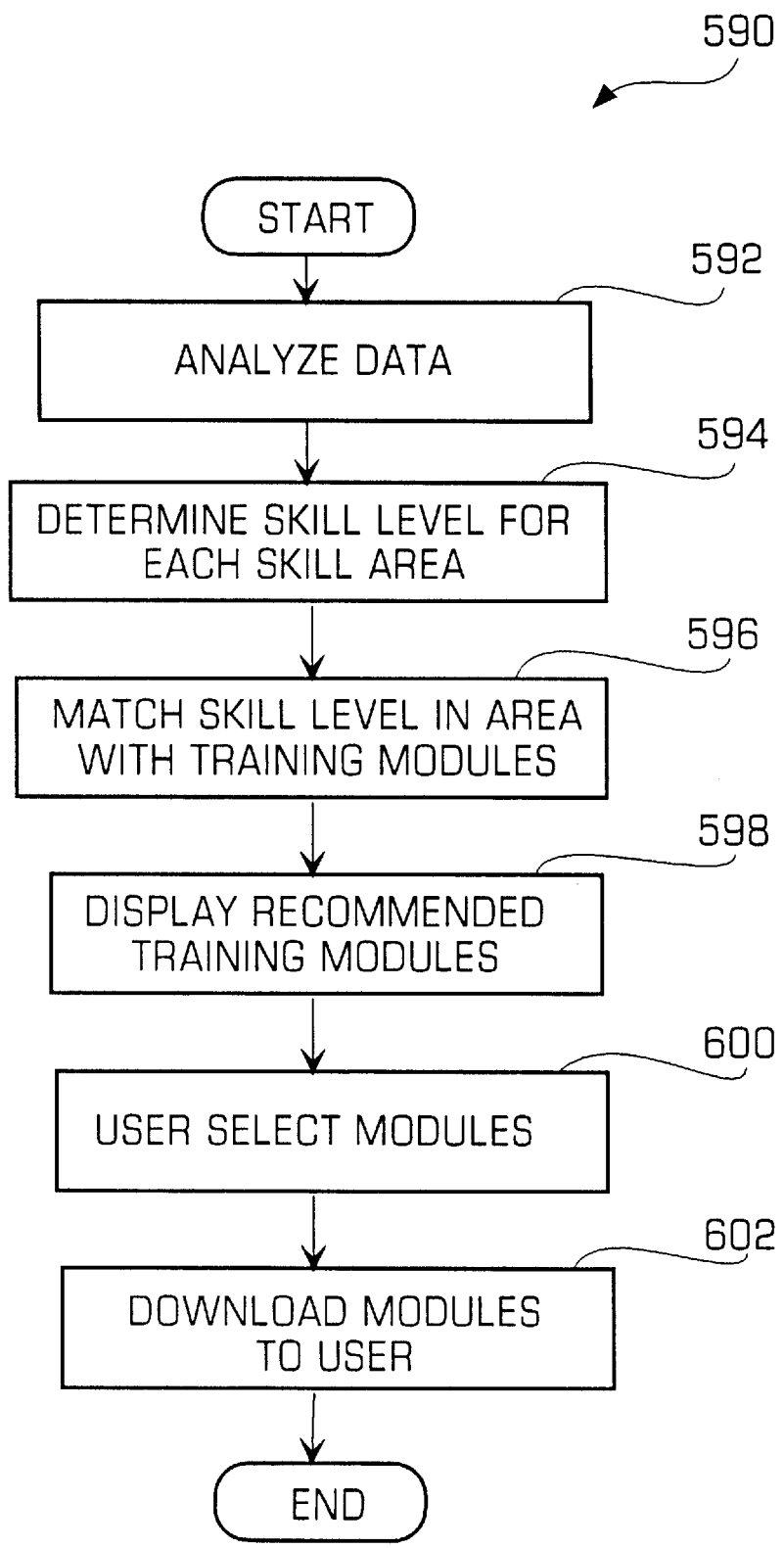
FIG. 27 is a flowchart illustrating the operating of the training module recommender in accordance with the invention.

FIG. 27 is a flowchart illustrating the training recommender method 590 in accordance with the invention. The method identifies, recommends and makes available specific training modules based on an individual's or a group's assessment profile based on the results from the various tests performed by the diagnostic tool in accordance with the invention. In particular, the recommender may automatically recommend one or more training modules based on the test results. In step 592, the recommender gathers the data for the individual or group and analyzes it. In step 594, the recommender determines the individual or group's skill in each skill area tested by the diagnostic tool. In step 596, the recommender matches the skill level of the individual or group in a particular skill area with an appropriate training module. For example, the particular score of a user, such as close to normal, on a particular test, such as rhyme recognition, may cause the recommender to recommend a lowest level (least amount of training) of the rhyme recognition training tool to help the child. For a child with more rhyme recognition deficiencies, the recommender may recommend a higher level training tool with more rhyme recognition training. An another example, the particular scores of a user on the various syllable types in the rhyme recognition test may cause the recommender to recommend no training for open rime syllable types but to recommend training for closed rime syllable types.

In step 598, the recommender may display the recommended training modules to the user. The user may then select the recommended training modules in step 600 and the training modules may be downloaded to the user's computer so that the user may use the training modules to improve the skill areas that require it. In this manner, the diagnostic system in accordance with the invention not only diagnoses reading problems using the various skill tests but also recommends training modules that may help improve a deficient skill. Thus, the diagnostic system makes it easy for a parent to have the child tested for deficiencies and then to receive the tools that help correct any deficiencies.

While the foregoing has been with reference to a particular embodiment of the invention, it will be appreciated by those skilled in the art that changes in this embodiment may be made without departing from the principles and spirit of the invention, the scope of which is defined by the appended.

What is claimed is:

1. A system for testing one or more skills associated with the reading skills of an individual, comprising:

a server computer comprising one or more tests for determining deficiencies in one or more reading and pre-reading skills, a scorer for determining a score for each test;

one or more client computers that may establish a communications session with the server computer to download the one or more tests from the server computer, each client computer comprising means for displaying at least one of a graphical image and audio associated with each test located on the server, means for receiving a user response to one of the graphical images and audio presented by each test and means for communicating the responses for each test back to the server computer so that a skill level for each test and each reading or pre-reading skill being tested by the test is determined; and wherein the server computer further comprises a recommender for recommending, based on the scores of the one or more tests, one or more training modules for improving a reading or pre-reading skill of the individual as indicated by the score of the tests.

2. The system of claim 1, wherein the server further comprises a questionnaire having one or more questions for eliciting information about risk factors associated with language-based learning disabilities.

3. The system of claim 2, wherein the information comprise historical data about reading-related risk factors including one or more of medical conditions including chronic otitis media, family history data including history of dyslexia, environmental data including socioeconomic status and exposure to literacy at home and observational data about an individual's behaviors reflecting competencies in speech sound awareness.

4. The system of claim 1, wherein the user input device of the one or more client computers comprise a speech recognition device for receiving and interpreting a verbal response from the user to the one or more tests.

5. The system of claim 1, wherein the one or more tests comprise a rhyme recognition test for testing the ability to recognize rhymes, a rhyme generation test for testing the ability to generate rhymes, a beginning and ending sound recognizer for testing the ability to recognize the beginning and ending sounds of a word, a word decoder test for testing the ability to read by sounding out a written word, a sound blender test for testing the ability to blend sound units together to form words, a sound segmenting test for testing the ability to segment a sound unit into smaller sound units, a sound manipulator test for testing the ability to manipulate sound units to form a new unit, a sequential verbal recall test for testing the ability to recall a sequence of spoken items, a rapid naming test for testing the ability to rapidly name one or more items, a letter naming and symbol/sound association test for testing the ability to name letters and identify the association between a symbol and an associated sound, and a fluent reader test for testing the ability to read fluently.

6. The system of claim 5 further comprising means for speaking the verbal response into the speech recognition device for receiving a verbal response from the user.

7. The system of claim 1, wherein the tests further comprise a rhyme recognition test further comprising means for providing at least two stimuli to the user and means for receiving user input in response to the at least two stimuli to determine the users ability to recognize rhyming words.

8. The system of claim 1, wherein the tests further comprise a test for recognizing the beginning sound of a stimulus, the test comprising means for generating at least one stimulus having at least an initial phoneme and means for receiving a response to the stimulus that indicates an ability of the test taker to recognize the initial phoneme of the stimulus.

9. The system of claim 1, wherein the tests further comprise a test for recognizing the ending sound of a stimulus, the test comprising means for generating at least one stimulus having at least an ending phoneme and means for receiving a response to the stimulus that indicates an ability of the test taker to recognize the ending phoneme of the stimulus.

10. The system of claim 1, wherein the tests further comprise a rhyme generation test comprising means for generating a stimulus and means for receiving a response from the user identifying a sound unit that rhymes with the stimulus.

11. The system of claim 1, wherein the tests further comprise a sound blender test comprising means for generating at least two sound stimuli and means for receiving a user response to the at least two sound stimuli, the response indicating an ability to blend the at least two sound stimuli into a larger sound unit.

12. The system of claim 1, wherein the tests further comprise a sound segmentation test comprising means for generating at least one stimulus and means for receiving a response to the stimulus comprising means for segmenting the stimulus into smaller units in order to test the ability to segment the stimulus into smaller units.

13. The system of claim 1, wherein the tests comprise a sound manipulation test comprising means for generating a sound stimulus having one or more sound units and means, in response to the sound stimulus, for manipulating the sound units of the sound stimulus to test the ability to manipulate sound units.

14. The system of claim 1, wherein the tests further comprises a verbal recall test comprising means for generating at least one sound stimulus and means, in response to the at least one sound stimulus, for receiving a user response indicating the recalling of the at least one sound stimulus.

15. The system of claim 1, wherein the tests further comprises a naming test comprising means for generating at least one visual stimulus and means, in response to the display of the visual stimulus, for speaking the name of or the sound associated with the visual stimulus using the speech recognition device.

16. The system of claim 1, wherein the tests further comprises a word decoder test comprising means for displaying a visual stimulus to the user and means, in response to the visual stimulus, for receiving a response from the user to determine the ability to read the visual stimulus.

17. The system of claim 1, wherein the tests further comprises a fluency test comprising means for generating a plurality of visual stimuli and means for receiving a user's response to the visual stimuli within a predetermined time interval to determine the user's ability to read and understand the visual stimuli.

18. A method for testing one or more skills associated with the reading skills of an individual, the method comprising:
presenting one or more stimuli to the individual, each stimulus associated with a test for testing a particular reading or pre-reading skill of the individual, the skills indicating the risk that the individual develops or has a language-based learning disability;
receiving a response from the individual to each stimulus;
scoring the user's responses to each test; and
recommending, based on the scores of the one or more tests, one or more training modules for improving a reading or pre-reading skill of the individual as indicated by the score of the tests.

19. The method of claim 18 further comprises questioning the individual to elicit information about risk factors associated with language-based learning disabilities.

20. The method of claim 19, wherein the information comprise historical data about reading-related risk factors including one or more of medical conditions including chronic otitis media, family history data including history of dyslexia, environmental data including socioeconomic status and exposure to literacy at home and observational data about an individual's behaviors reflecting competencies in speech sound awareness.

21. The method of claim 18, wherein receiving the individual's response comprises receiving and interpreting a verbal response using a speech recognition device for receiving a verbal response from the user to the one or more tests.

22. The method of claim 18, wherein the one or more tests comprise a rhyme recognition test for testing the ability to recognize rhymes, a rhyme generation test for testing the ability to generate rhymes, a beginning and ending sound recognizer for testing the ability to recognize the beginning and ending sounds of a word, a word decoder test for testing the ability to read by sounding out a written word, a sound blender test for testing the ability to blend sound units together to form words, a sound segmenting test for testing the ability to segment a sound unit into smaller sound units, a sound manipulator test for testing the ability to manipulate sound units to form a new sound unit, a sequential verbal recall test for testing the ability to recall a sequence of spoken items, a rapid naming test for testing the ability to rapidly name one or more items, a letter naming and symbol/sound association test for testing the ability to name letters and identify the association between a symbol and an associated sound, and a fluent reader test for testing the ability to read fluently.

23. The method of claim 22 further comprising speaking a verbal response into the speech recognition device for receiving a verbal response from the user.

24. The method of claim 18, wherein the tests further comprise a rhyme recognition test further comprising providing at least two stimuli to the user and receiving user input in response to the at least two stimuli to determine the user's ability to recognize rhyming words.

25. The method of claim 18, wherein the tests further comprise a test for recognizing the beginning sound of a stimulus, the test comprising generating at least one stimulus having at least an initial phoneme and receiving a response to the stimulus that indicates an ability of the test taker to recognize the initial phoneme of the stimulus.

26. The method of claim 18, wherein the tests further comprise a test for recognizing the ending sound of a sound stimulus, the test comprising generating at least one stimulus having at least an ending phoneme and receiving a response to the stimulus that indicates an ability of the test taker to recognize the ending phoneme of the stimulus.

27. The method of claim 18, wherein the tests further comprise a rhyme generation test comprising generating a stimulus and receiving a response from the user identifying a sound unit that rhymes with the stimulus.

28. The method of claim 18 wherein the tests further comprise a sound blender test comprising generating at least two sound stimuli and receiving a user response to the at least two sound stimuli, the response indicating an ability to blend the at least two sound stimuli into a larger sound unit.

29. The method of claim 18, wherein the tests further comprise a sound segmentation test comprising generating at least one stimulus and receiving a response to the stimulus comprising means for segmenting the stimulus into smaller units in order to test the ability to segment the stimulus into smaller units.

30. The method of claim 18, wherein the tests comprise a sound manipulation test comprising generating a sound stimulus having one or more sound units and, in response to the sound stimulus, manipulating the sound units of the sound stimulus to test the ability to manipulate sound units.

31. The method of claim 18, wherein the tests further comprises a verbal recall test comprising generating at least one sound stimulus and, in response to the at least one sound stimulus, receiving a user response from the user to test the ability to recall the at least one sound stimulus.

32. The method of claim 18, wherein the tests further comprises a naming test comprising generating at least one visual stimulus and, in response to the display of the visual stimulus, speaking the name of or the sound associated with the visual stimulus using the speech recognition device.

33. The method of claim 18, wherein the tests further comprises a word decoder test comprising displaying a visual stimulus to the user and, in response to the visual stimulus, receiving a response from the user to determine the ability to read the visual stimulus.

34. The method of claim 18, wherein the tests further comprises a fluency test comprising generating a plurality of visual stimuli and receiving a user's response to the visual stimuli within a predetermined time interval to determine the user's ability to read and understand the visual stimuli.

35. A server for testing one or more skills associated with the reading skills of an individual, comprising:
  one or more tests for determining deficiencies in one or more reading and pre-reading skills;
  means for receiving responses from the individual to the one or more tests;
  a scorer for determining a score for each test; and
  a recommender for recommending, based on the scores of the one or more tests, one or more training modules to the individual for improving reading or pre-reading skill of the individual as indicated by the score of the tests.

36. The server of claim 35, wherein the server further comprises a questionnaire having one or more questions for eliciting information about risk factors associated with language-based learning disabilities.

37. The server of claim 36, wherein the information comprise historical data about reading-related risk factors including one or more of medical conditions including chronic otitis media, family history data including history of dyslexia, environmental data including socioeconomic status and exposure to literacy at home and observational data about an individuals behaviors reflecting competencies in speech sound awareness.

38. The server of claim 35, wherein the receiving means further comprises means for receiving and interpreting a verbal response from a speech recognition device to the one or more tests.

39. The server of claim 35, wherein the one or more tests comprise a rhyme recognition test for testing the ability to recognize rhymes, a rhyme generation test for testing the ability to generate rhymes, a beginning and ending sound recognizer for testing the ability to recognize the beginning and ending sounds of a word, a word decoder test for testing the ability to read by sounding out a written word, a sound blender test for testing the ability to blend sound units together to form words, a sound segmenting test for testing the ability to segment a sound unit into smaller sound units, a sound manipulator test for testing the ability to manipulate sound units to form a new unit, a sequential verbal recall test for testing the ability to recall a sequence of spoken items, a rapid naming test for testing the ability to rapidly name one or more items, a letter naming and symbol/sound association test for testing the ability to name letters and identify the association between a symbol and an associated sound, and a fluent reader test for testing the ability to read fluently.

40. The server of claim 39 further comprising means for speaking a verbal response into the speech recognition device for receiving a verbal response from the user.

41. The server of claim 35, wherein the tests comprises a rhyme recognition test further comprising means for providing at least two stimuli to the user and means for receiving user input in response to the at least two stimuli to determine the user's ability to recognize rhyming words.

42. The server of claim 35, wherein the tests further comprise a test for recognizing the beginning sound of a stimulus, the test comprising means for generating at least one stimulus having at least an initial phoneme and means for receiving a response to the stimulus that indicates an ability of the test taker to recognize the initial phoneme of the stimulus.

43. The server of claim 35, wherein the tests further comprise a test for recognizing the ending sound of a stimulus, the test comprising means for generating at least one stimulus having at least an ending phoneme and means for receiving a response to the stimulus that indicates an ability of the test taker to recognize the ending phoneme of the stimulus.

44. The server of claim 35, wherein the tests further comprise a rhyme generation test comprising means for generating a stimulus and means for receiving a response from the user identifying a sound unit that rhymes with the stimulus.

45. The server of claim 35, wherein the tests further comprise a sound blender test comprising means for generating at least two sound stimuli and means for receiving a user response to the at least two sound stimuli, the response indicating an ability to blend the at least two sound stimuli into a larger sound unit.

46. The server of claim 35, wherein the tests further comprise a sound segmentation test comprising means for generating at least one stimulus and means for receiving a response to the stimulus comprising means for segmenting the stimulus into smaller units in order to test the ability to segment the stimulus into smaller units.

47. The server of claim 35, wherein the tests comprise a sound manipulation test comprising means for generating a sound stimulus having one or more sound units and means, in response to the sound stimulus, for manipulating the sound units of the sound stimulus to test the ability to manipulate sound units.

48. The server of claim 35, wherein the tests further comprises a verbal recall test comprising means for generating at least one sound stimulus and means, in response to the at least one sound stimulus, for receiving a user response indicating the recalling of the at least one sound stimulus.

49. The server of claim 35, wherein the tests further comprises a naming test comprising means for generating at least one visual stimulus and means, in response to the display of the visual stimulus, for speaking the name of or the sound associated with the visual stimulus using the speech recognition device.

50. The server of claim 35, wherein the tests further comprises a word decoder test comprising means for displaying a visual stimulus to the user and means, in response to the visual stimulus, for receiving a response from the user to determine the ability to read the visual stimulus.

51. The server of claim 35, wherein the tests further comprises a fluency test comprising means for generating a plurality of visual stimuli and means for receiving a user's response to the visual stimuli within a predetermined time interval to determine the user's ability to read and understand the visual stimuli.

52. An apparatus for testing one or more skills associated with the reading skills of an individual comprising:

means for downloading one or more tests from a server, each test determining if the individual has a deficiency in a reading or pre-reading skill;

means for generating a response to the tests, the response being communicated to the server computer;

means for receiving a score for each test from the server computer; and means for receiving a recommendation, based on the scores of the one or more tests, for using one or more training modes for improving a reading or pre-reading skill of the individual as indicated by the score of the tests to avoid or remediated language-based learning disabilities.

53. The apparatus of claim 52 further comprises a questionnaire having one or more questions for eliciting information about risk factors associated with language-based learning disabilities.

54. The apparatus of claim 53, wherein the information comprise historical data about reading-related risk factors including one or more of medical conditions including chronic otitis media, family history data including history of dyslexia, environmental data including socioeconomic status and exposure to literacy at home and observational data about an individual's behaviors reflecting competencies in speech sound awareness.

55. The apparatus of claim 52, wherein the user input device of the one or more client computers comprise a speech recognition device for receiving and interpreting a verbal response from the user to the one or more tests.

56. The apparatus of claim 52, wherein the one or more tests comprise a rhyme recognition test for testing the ability to recognize rhymes, a rhyme generation test for testing the ability to generate rhymes, a beginning and ending sound recognizer for testing the ability to recognize the beginning and ending sounds of a word, a word decoder test for testing the ability to read by sounding out a written word, a sound blender test for testing the ability to blend sound units together to form words, a sound segmenting test for testing the ability to segment a sound unit into smaller sound units, a sound manipulator test for testing the ability to manipulate sound units to form a new unit, a sequential verbal recall test for testing the ability to recall a sequence of spoken items, a rapid naming test for testing the ability to rapidly name one or more items, a letter naming and symbol/sound association test for testing the ability to name letters and identify the association between a symbol and an associated sound, and a fluent reader test for testing the ability to read fluently.

57. The apparatus of claim 56, wherein the tests further comprises means for speaking a verbal response into the speech recognition device for receiving a verbal response from the user.

58. The apparatus of claim 52, wherein the tests comprises a rhyme recognition test further comprising means for providing at least two stimuli to the user and means for receiving user input in response to the at least two stimuli to determine the user's ability to recognize rhyming words.

59. The apparatus of claim 52, wherein the tests further comprise a test for recognizing the beginning sound of a stimulus, the test comprising means for generating at least one stimulus having at least an initial phoneme and means for receiving a response to the stimulus that indicates an ability of the test taker to recognize the initial phoneme of the stimulus.

60. The apparatus of claim 52, wherein the tests further comprise a test for recognizing the ending sound of a stimulus, the test comprising means for generating at least one stimulus having at least an ending phoneme and means for receiving a response to the stimulus that indicates an ability of the test taker to recognize the ending phoneme of the stimulus.

61. The apparatus of claim 52, wherein the tests further comprise a rhyme generation test comprising means for generating a stimulus and means for receiving a response from the user identifying a sound unit that rhymes with the stimulus.

62. The apparatus of claim 52, wherein the tests further comprise a sound blender test comprising means for generating at least two sound stimuli and means for receiving a user response to the at least two sound stimuli, the response indicating an ability to blend the at least two sound stimuli into a larger sound unit.

63. The apparatus of claim 52, wherein the tests further comprise a sound segmentation test comprising means for generating at least one stimulus and means for receiving a response to the stimulus comprising means for segmenting the stimulus into smaller units in order to test the ability to segment the stimulus into smaller units.

64. The apparatus of claim 52, wherein the tests comprise a sound manipulation test comprising means for generating a sound stimulus having one or more sound units and means, in response to the sound stimulus, for manipulating the sound units of the sound stimulus to test the ability to manipulate sound units.

65. The apparatus of claim 52, wherein the tests further comprises a verbal recall test comprising means for generating at least one sound stimulus and means, in response to the at least one sound stimulus, for receiving a user response indicating the recalling of the at least one sound stimulus.

66. The apparatus of claim 52, wherein the tests further comprises a naming test comprising means for generating at least one visual stimulus and means, in response to the display of the visual stimulus, for speaking the name of or the sound associated with the visual stimulus using the speech recognition device.

67. The apparatus of claim 52, wherein the tests further comprises a word decoder test comprising means for displaying a visual stimulus to the user and means, in response to the visual stimulus, for receiving a response from the user to determine the ability to read the visual stimulus.

68. The apparatus of claim 52, wherein the tests further comprises a fluency test comprising means for generating a plurality of visual stimuli and means for receiving a user's response to the visual stimuli within a predetermined time interval to determine the user's ability to read and understand the visual stimuli.

* * * * *